(12) United States Patent
Park et al.

(10) Patent No.: US 9,627,980 B2
(45) Date of Patent: Apr. 18, 2017

(54) POWER CONVERSION APPARATUS AND PHOTOVOLTAIC MODULE

(71) Applicant: LG ELECTRONICS INC., Seoul (KR)

(72) Inventors: Giyob Park, Seoul (KR); Youngbok Jung, Seoul (KR); Heungchan Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 14/622,293

(22) Filed: Feb. 13, 2015

(65) Prior Publication Data

US 2015/0236599 A1 Aug. 20, 2015

(30) Foreign Application Priority Data

Feb. 19, 2014 (KR) ........................ 10-2014-0019232

(51) Int. Cl.
| | |
|---|---|
| *H02H 7/122* | (2006.01) |
| *H02H 3/20* | (2006.01) |
| *H02H 9/04* | (2006.01) |
| *H02M 3/335* | (2006.01) |
| *H02M 5/458* | (2006.01) |
| *H02M 1/08* | (2006.01) |

(52) U.S. Cl.
CPC ......... *H02M 3/33507* (2013.01); *H02M 1/08* (2013.01); *H02M 5/458* (2013.01)

(58) Field of Classification Search
CPC .......... H02M 1/12; H02M 1/126; H02M 1/32; H02M 1/34; H02M 2001/123; H02M 2001/342; H02M 2001/344; H02M 2001/346; H02M 2001/348; H02H 3/20; H02H 3/202; H02H 9/042
USPC ................... 363/56.01, 56.12; 361/91.7, 111
See application file for complete search history.

(56) References Cited

U.S. PATENT DOCUMENTS

| | | | |
|---|---|---|---|
| 5,144,204 A | 9/1992 | Nerone et al. | |
| 5,943,200 A | 8/1999 | He | |
| 2001/0005322 A1* | 6/2001 | Uchida | H02M 1/34 363/97 |
| 2006/0028186 A1 | 2/2006 | Yan | |
| 2006/0170374 A1* | 8/2006 | Kambara | H02M 1/34 315/274 |
| 2006/0226816 A1* | 10/2006 | Wai | H02M 1/34 323/222 |

(Continued)

FOREIGN PATENT DOCUMENTS

| | | |
|---|---|---|
| EP | 2 621 075 A2 | 7/2013 |
| JP | 60-151296 U | 10/1985 |

(Continued)

*Primary Examiner* — Adolf Berhane
*Assistant Examiner* — Gary Nash
(74) *Attorney, Agent, or Firm* — Birch, Stewart, Kolasch & Birch, LLP

(57) ABSTRACT

Disclosed are a power conversion apparatus and a photovoltaic module. The power conversion apparatus includes a converter unit configured to convert a direct current (DC) voltage from a solar cell module, a clamp unit configured to limit a surge voltage in the converter unit, and a controller configured to control the converter unit. Through this configuration, the power conversion apparatus is capable of limiting a surge voltage depending on operation of the converter unit.

19 Claims, 24 Drawing Sheets

(56) References Cited

U.S. PATENT DOCUMENTS

| | | | |
|---|---|---|---|
| 2008/0169792 A1* | 7/2008 | Orr | H02M 3/155 323/222 |
| 2010/0097828 A1 | 4/2010 | Chen | |
| 2010/0118576 A1 | 5/2010 | Osaka | |
| 2011/0090716 A1* | 4/2011 | Asuke | H02M 1/34 363/21.01 |
| 2012/0257422 A1 | 10/2012 | Lee et al. | |
| 2012/0262948 A1* | 10/2012 | Lee | H02S 40/34 363/16 |
| 2012/0325288 A1* | 12/2012 | Jang | H02J 3/385 136/246 |
| 2013/0121038 A1* | 5/2013 | Ryu | H02M 7/4807 363/21.14 |
| 2013/0193775 A1* | 8/2013 | Lee | H02J 5/00 307/151 |

FOREIGN PATENT DOCUMENTS

| | | | |
|---|---|---|---|
| JP | 2001-286133 A | 10/2001 | |
| JP | 2008-278679 A1 | 11/2008 | |
| JP | 2010-119285 A | 5/2010 | |

\* cited by examiner

POWER CONVERSION APPARATUS AND PHOTOVOLTAIC MODULE

CROSS-REFERENCE TO RELATED APPLICATION

This application claims the priority benefit of Korean Patent Applications No. 10-2014-0019232, filed on Feb. 19, 2014 in the Korean Intellectual Property Office, the disclosures of which are incorporated herein by reference.

BACKGROUND OF THE INVENTION

1. Field of the Invention

The present invention relates to a power conversion apparatus and a photovoltaic module and, more particularly, to a power conversion apparatus which is capable of limiting a surge voltage depending on operation of a converter unit and a photovoltaic module.

2. Description of the Related Art

In recent years, due to depletion of existing energy resources, such as petroleum and coal, interest in alternative sources of energy to replace the existing energy resources is increasing. Most of all, solar cells are popular next generation cells to convert sunlight into electrical energy using semiconductor devices.

A photovoltaic module is defined by series or parallel connection of solar cells for photovoltaic power generation. The photovoltaic module may include a junction box for gathering electricity generated by the solar cells.

SUMMARY OF THE INVENTION

Therefore, the present invention has been made in view of the above problems, and it is an object of the present invention to provide a power conversion apparatus which is capable of limiting a surge voltage depending on operation of a converter unit and a photovoltaic module.

In accordance with an aspect of the present invention, the above and other objects can be accomplished by the provision of a power conversion apparatus including a converter unit configured to convert a direct current (DC) voltage from a solar cell module, a clamp unit configured to limit a surge voltage in the converter unit, and a controller configured to control the converter unit.

In accordance with another aspect of the present invention, there is provided a photovoltaic module including a solar cell module including a plurality of solar cells, and a junction box attached to a rear surface of the solar cell module, the junction box including a power conversion module configured to perform power conversion of a DC voltage supplied from the solar cell module and to output the DC voltage, wherein the power conversion module includes at least one bypass diode configured to receive the DC voltage from the solar cell module, a converter unit configured to convert the DC voltage from the bypass diode, a clamp unit configured to limit a surge voltage in the converter unit, and a controller configured to control the converter unit.

BRIEF DESCRIPTION OF THE DRAWINGS

The above and other objects, features and other advantages of the present invention will be more clearly understood from the following detailed description taken in conjunction with the accompanying drawings, in which:

FIGS. 9A and 9B are views referred to for description of the operation of a tapped inductor converter illustrated in FIG. 7a;

DETAILED DESCRIPTION OF THE PREFERRED EMBODIMENTS

Hereinafter, the present invention will be described in detail with reference to the accompanying drawings.

With respect to constituent elements used in the following description, suffixes "module" and "unit" are given or mingled with each other only in consideration of ease in the preparation of the specification, and do not have or serve as different meanings. Accordingly, the suffixes "module" and "unit" may be mingled with each other.

Figure 1:
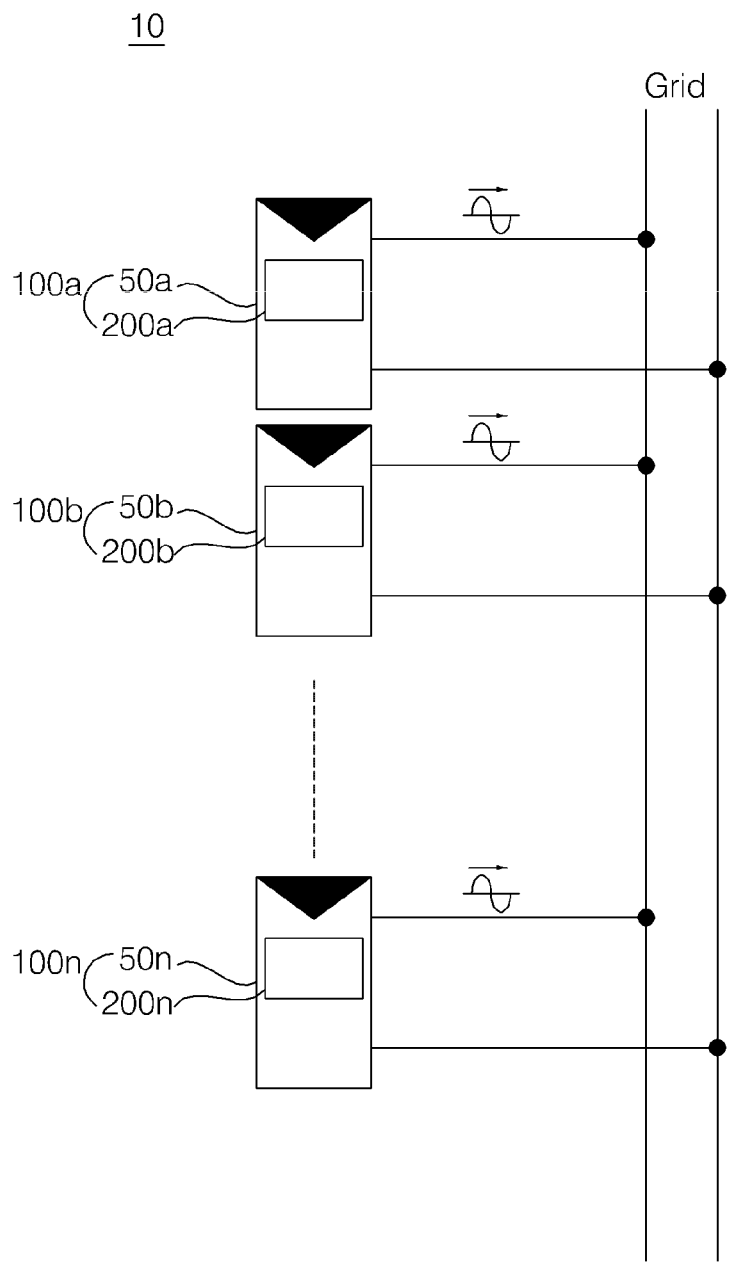
FIG. 1 is a view illustrating an exemplary configuration of a photovoltaic system according to an embodiment of the present invention.

FIG. 1 is a view illustrating an exemplary configuration of a photovoltaic system according to an embodiment of the present invention.

Referring to FIG. 1, the photovoltaic system, designated by reference numeral 10, may include a plurality of photovoltaic modules 50a, 50b, . . . , 50n.

The photovoltaic modules 50a, 50b, . . . , 50n may respectively include solar cell modules 100a, 100b, . . . , 100n, each of which includes a plurality of solar cells and generates a direct current (DC) voltage, and junction boxes 200a, 200b, . . . , 200n, each of which is attached to a rear surface of a corresponding one of the solar cell modules 100a, 100b, . . . , 100n and configured to convert the DC voltage from a corresponding one of the solar cell modules 100a, 100b, . . . , 100n into an alternating current (AC) voltage and to output the converted AC voltage.

At this time, each of the junction boxes 200a, 200b, . . . , 200n may include a power conversion module 700 (see FIG. 6) configured to convert the DC voltage from a corresponding one of the solar cell modules 100a, 100b, . . . , 100n into an AC voltage and output the converted AC voltage. Here, the power conversion module 700 (see FIG. 6) may also be called a power conversion apparatus.

The power conversion module 700 (see FIG. 6) may include bypass diodes Da, Db, Dc, a converter unit 530 (see FIG. 6), and an inverter unit 540 (see FIG. 6), all of which are disposed on a single circuit board. For this reason, the power conversion module 700 (see FIG. 6) may be referred to as a micro inverter.

In the embodiment of the present invention, on the other hand, the photovoltaic modules 50a, 50b, . . . , 50n may directly output AC voltages via the respective solar cell modules 100a, 100b, . . . , 100n and the respective junction boxes 200a, 200b, . . . , 200n. For this reason, the photovoltaic modules 50a, 50b, . . . , 50n may be referred to as photovoltaic AC modules.

Through the above-described configuration in which the micro inverters are attached to the respective solar cell modules 100a, 100b, . . . , 100n to output the AC voltages, even if any one of the solar cell modules is reduced in output power, the generated AC voltages may be supplied to a system (grid) because the photovoltaic modules 50a, 50b, . . . , 50n are connected in parallel to one another.

In addition, unlike a string mode in which the photovoltaic modules 50a, 50b, . . . , 50n are connected in series to one another, the photovoltaic modules 50a, 50b, . . . , 50n are connected in parallel to generate and output the AC voltages independently of one another. Therefore, each of the photovoltaic modules 50a, 50b, . . . , 50n may stably output the AC voltage to a system regardless of output of the AC voltages from the other photovoltaic modules.

Figure 6:
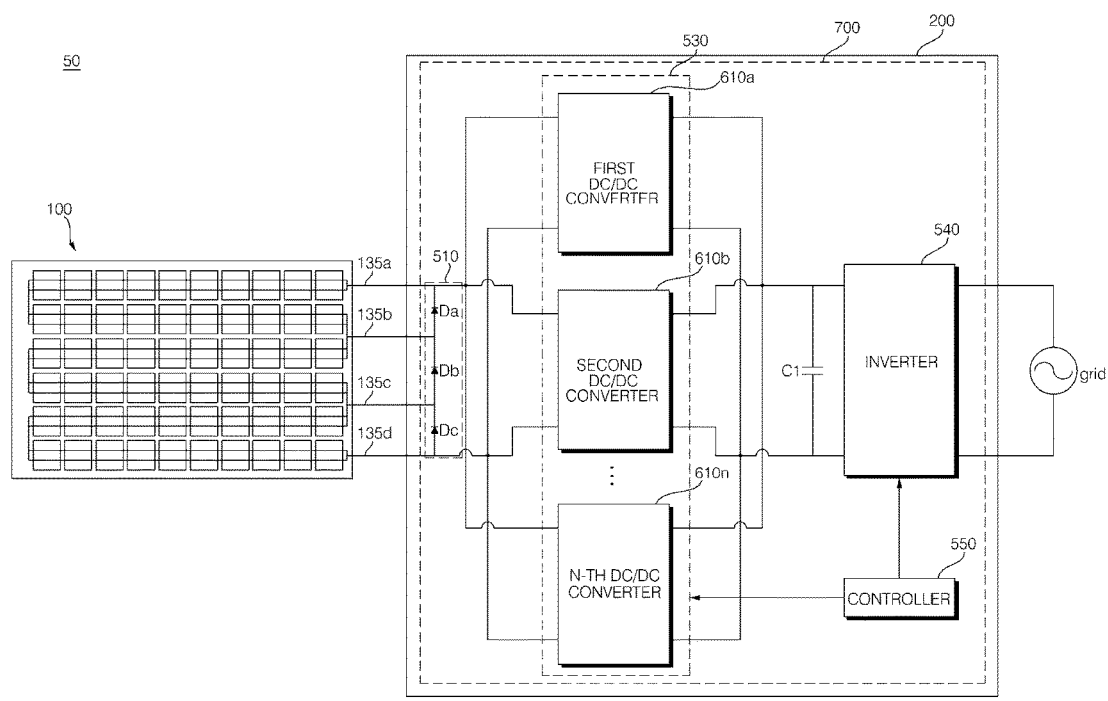
FIG. 6 is a block diagram illustrating an exemplary power conversion module in a junction box illustrated in FIG. 2.

In the embodiment of the present invention, the power conversion module 700 (see FIG. 6) may include the converter unit 530 (see FIG. 6), a clamp unit 1610 (see FIG. 16A) to limit a surge voltage in the converter unit 530 (see FIG. 6), and a controller 550 (see FIG. 6) to control the converter unit 530 (FIG. 6).

In one example, the converter unit 530 (see FIG. 6) may include a primary side inductor $L_1$ (see FIG. 16A), a secondary side inductor $L_2$ (see FIG. 16A), and a switching element S1 (see FIG. 16A) connected between the primary side inductor $L_1$ (see FIG. 16A) and a ground terminal. The clamp unit 1610 (see FIG. 16A) may include a first clamp diode $D_{clamp1}$ (see FIG. 16A) having one terminal connected between the primary side inductor $L_1$ (see FIG. 16A) and the switching element S1 (see FIG. 16A), a clamp capacitor $c_{clamp}$ (see FIG. 16A) connected between the other terminal of the first clamp diode $D_{clamp1}$ (see FIG. 16A) and an input terminal of the primary side inductor $L_1$ (see FIG. 16A), and a second clamp diode $D_{clamp2}$ (see FIG. 16A) connected between the other terminal of the first clamp diode (see FIG. 16A) and the secondary side inductor $L_2$ (see FIG. 16A).

In another example, the converter unit 530 (see FIG. 6) may include the primary side inductor $L_1$ (see FIG. 16A), the secondary side inductor $L_2$ (see FIG. 16A), and the switching element S1 (see FIG. 16A) connected between the primary side inductor $L_1$ (see FIG. 16A) and the ground terminal. The clamp unit 1610 (see FIG. 16A) may include the first clamp diode $D_{clamp1}$ (see FIG. 16A) having one terminal connected between the primary side inductor $L_1$ (see FIG. 16A) and the switching element S1 (see FIG. 16A), the clamp capacitor $C_{clamp}$ (see FIG. 16A) connected between the other terminal of the first clamp diode $D_{clamp1}$ (see FIG. 16A) and the ground terminal, and the second clamp diode $D_{clamp2}$ (see FIG. 16A) connected between the other terminal of the first clamp diode $D_{clamp1}$ (see FIG. 16A) and the secondary side inductor $L_2$ (see FIG. 16A).

At this time, the converter unit 530 (see FIG. 6) may store energy in the primary side inductor $L_1$ (see FIG. 16A) as the switching element S1 (see FIG. 16A) is turned on and may output the energy stored in the primary side inductor $L_1$ (see FIG. 16A) through the secondary side inductor $L_2$ (see FIG. 16A) as the switching element S1 (see FIG. 16A) is turned off. The clamp unit 1610 (see FIG. 16A) may store a surge voltage, generated when the switching element S1 (see FIG. 16A) is turned on or turned off, in the clamp capacitor $C_{clamp}$ (see FIG. 16A) through the first clamp diode $D_{clamp1}$ (see FIG. 16A) and may output the surge voltage stored in the clamp capacitor $C_{clamp}$ (see FIG. 16A) through the second clamp diode $D_{clamp2}$ (see FIG. 16A) when the switching element S1 (see FIG. 16A) is turned off.

Meanwhile, the converter unit 530 (see FIG. 6) may include a plurality of interleaving converters and a plurality of clamp units 1610 (see FIG. 16A) to limit surge voltages in the interleaving converters.

In this way, a surge voltage depending on operation of the converter unit 530 (see FIG. 6) may be limited. Accordingly, stability of elements in the power conversion module 700 (see FIG. 6) may be enhanced.

This voltage clamping as described above will be described later in detail with reference to FIG. 16A as well as the following drawings.

Figure 2:
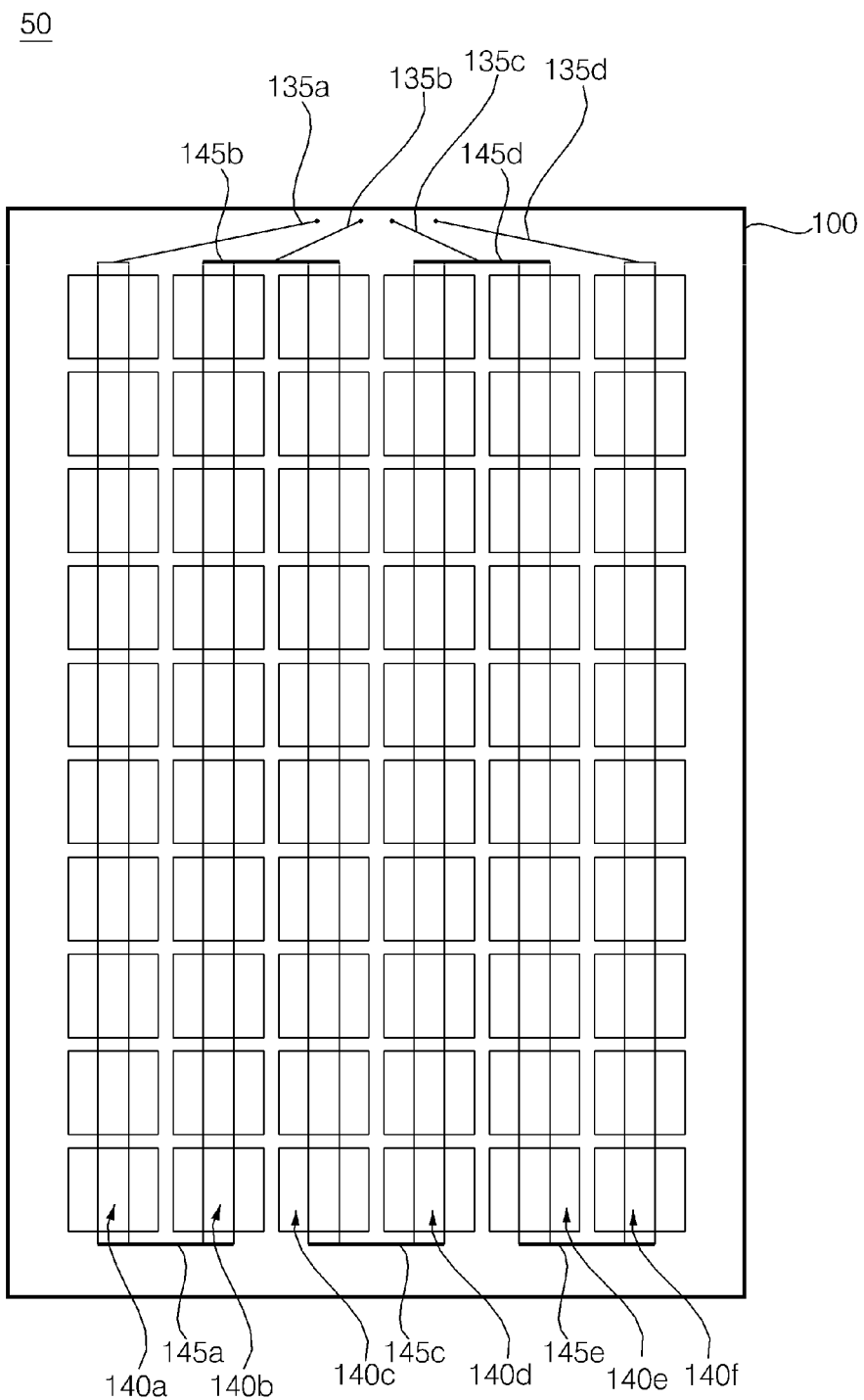
FIG. 2 is a front view of a photovoltaic module according to an embodiment of the present invention.
Figure 3:
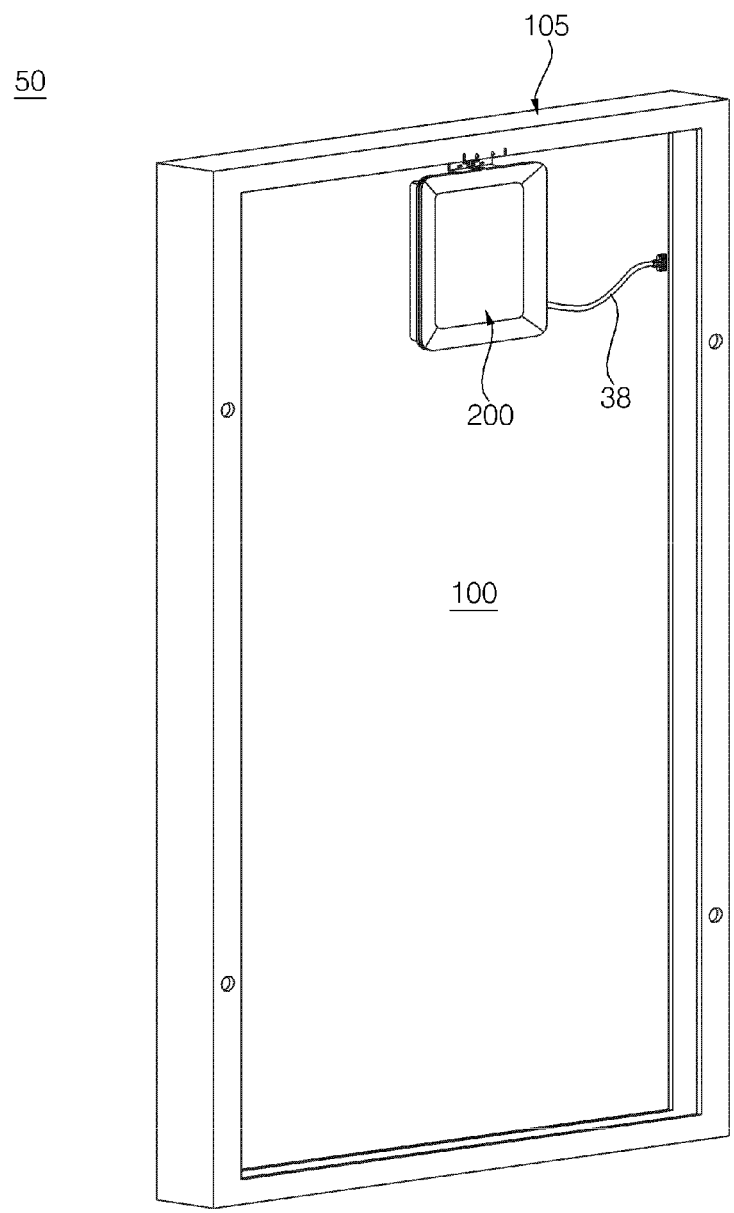
FIG. 3 is a rear view of the photovoltaic module of FIG. 2.
Figure 4:
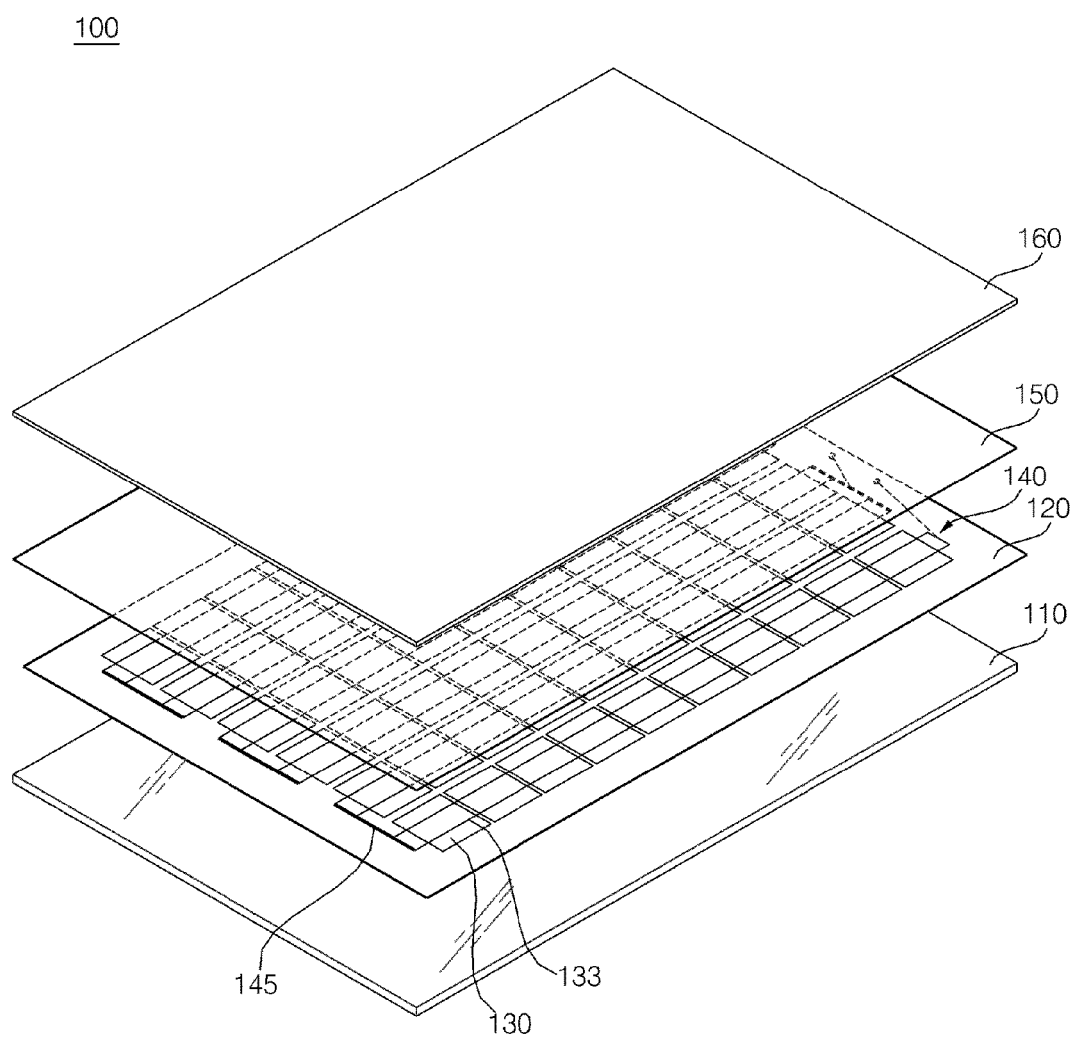
FIG. 4 is an exploded perspective view of the photovoltaic module of FIG. 2.

FIG. 2 is a front view of a photovoltaic module according to an embodiment of the present invention, FIG. 3 is a rear view of the photovoltaic module of FIG. 2, and FIG. 4 is an exploded perspective view of the photovoltaic module of FIG. 2.

Referring to FIGS. 2 to 4, the photovoltaic module according to the embodiment of the present invention, designated by reference numeral 50, may include a solar cell module 100 and a junction box 200 disposed on one surface of the solar cell module 100. In addition, the photovoltaic module 50 may further include a heat dissipation member (not illustrated) interposed between the solar cell module 100 and the junction box 200.

The solar cell module 100 may include a plurality of solar cells 130. In addition, the solar cell module 100 may further include a first sealing member 120 disposed on the bottom of the solar cells 130, and a second sealing member 150 disposed on the top of the solar cells 130, a rear substrate 110 disposed on a lower surface of the first sealing member 120, and a front substrate 160 disposed on an upper surface of the second sealing member 150.

Each solar cell 130 is a semiconductor device that converts solar energy into electrical energy, and may be a silicon solar cell, a compound semiconductor solar cell, a tandem solar cell, a dye sensitized solar cell, a CdTe or CIGS type solar cell, or the like.

The solar cell 130 includes a light receiving surface on which sunlight is incident and a back surface opposite to the light receiving surface. For example, the solar cell 130 may include a silicon substrate of a first conductive type, a semiconductor layer formed on the silicon substrate and having a second conductive type which is opposite to the first conductive type, an anti-reflection film formed on the semiconductor layer of the second conductive type and having at least one opening to expose a portion of a surface of the semiconductor layer of the second conductive type, a front electrode coming into contact with the surface portion of the semiconductor layer of the second conductive type exposed through the at least one opening, and a rear electrode formed on a rear surface of the silicon substrate.

The respective solar cells 130 may be electrically connected in series, in parallel, or in series-parallel combination to one another. More specifically, the solar cells 130 may be electrically connected to one another using ribbons 133. Each ribbon 133 may be bonded to the front electrode formed on the light receiving surface of any one solar cell 130 and the rear electrode formed on the rear surface of another neighboring solar cell 130.

It is illustrated in FIGS. 2 to 4 that the ribbons 133 are arranged in two rows and the solar cells 130 are connected to one another in a line by the ribbons 133 to constitute a solar cell string 140. As such, as illustrated in FIGS. 2 to 4, there are provided six solar cell strings 140a, 140b, 140c, 140d, 140e and 140f and each solar cell string consists of ten solar cells. However, unlike FIGS. 2 to 4, various modifications may be provided.

Meanwhile, the respective solar cell strings may be electrically connected to one another using bus ribbons. It is illustrated in FIG. 2 that bus ribbons 145a, 145c and 145e, disposed at the bottom of the solar cells 130, achieve electrical connection between a first solar cell string 140a and a second solar cell string 140b, between a third solar cell string 140c and a fourth solar cell string 140d, and between a fifth solar cell string 140e and a sixth solar cell string 140f. In addition, it is illustrated in FIG. 2 that bus ribbons 145b and 145d, disposed at the top of the solar cells 130, achieve electrical connection between the second solar cell string 140b and the third solar cell string 140c and between the fourth solar cell string 140d and the fifth solar cell string 140e.

The ribbon 133 connected to the first solar cell string 140a, the bus ribbons 145b and 145d, and the ribbon 133 connected to the fourth solar cell string 140d are electrically connected to first to fourth conductive lines 135a, 135b, 135c and 135d respectively and, in turn, the first to fourth conductive lines 135a, 135b, 135c and 135d are connected to the bypass diodes Da, Db and Dc (see FIG. 6) within the junction box 200 that is disposed on a rear surface of the solar cell module 100. It is illustrated in FIG. 2 that the first to fourth conductive lines 135a, 135b, 135c and 135d extend to the rear surface of the solar cell module 100 through apertures perforated in the solar cell module 100.

Preferably, the junction box 200 is located close to one of both ends of the solar cell module 100 to which the conductive lines 135a, 135b, 135c and 135d extend.

As exemplarily illustrated in FIGS. 2 and 3, the junction box 200 is located at the top of the rear surface of the solar cell module 100 because the first to fourth conductive lines 135a, 135b, 135c and 135d extend from the top of the solar cell module 100 to the rear surface of the solar cell module 100. Therefore, each conductive line may be reduced in length, which results in reduced power loss.

The rear substrate 110 serves as a back sheet having waterproof, insulation, and ultraviolet (UV) blocking functions, and may be a Tedlar/PET/Tedlar (TPT) type, without being limited thereto. In addition, while the rear substrate 110 is illustrated in FIG. 4 as having a rectangular shape, the rear substrate 110 may be fabricated into various shapes, such as circular and semicircular shapes, according to an environment in which the solar cell module 100 is installed or to be installed.

The first sealing member 120 having the same size as the rear substrate 110 may be attached to the rear substrate 110 and the solar cells 130 may be arranged next to one another to form a plurality of lines on the first sealing member 120.

The second sealing member 150 may be disposed on the top of the solar cells 130 and bonded to the first sealing member 120 via lamination.

Here, the first sealing member 120 and the second sealing member 150 enable chemical coupling of respective elements of the solar cells. Each of the first sealing member 120 and the second sealing member 150 may be formed of any one of various materials, such as an ethylene vinyl acetate (EVA) film.

The front substrate 160 may be disposed on the second sealing member 150 to permit passage of sunlight therethrough. The front substrate 160 is preferably a tempered glass to protect the solar cells 130 from, for example, external shock. More preferably, to prevent reflection of sunlight and to enhance transmittance of sunlight, the front substrate 160 is a low-iron tempered glass.

The junction box 200 may be attached to the rear surface of the solar cell module 100 to perform power conversion using a DC voltage supplied from the solar cell module 100. More specifically, the junction box 200 may include the power conversion module 700 that converts a DC voltage into an AC voltage and outputs the converted AC voltage.

The power conversion module 700 may include the bypass diodes Da, Db and Dc, the converter unit 530 (see FIG. 6), and the inverter unit 540 (see FIG. 6), all of which are disposed on a single circuit board. This power conversion module 700 may be referred to as a micro inverter.

Meanwhile, to prevent water from reaching circuit elements within the junction box 200, the interior of the junction box 200 may be subjected to coating for water infiltration prevention using, for example, silicon.

In addition, the junction box 200 may have apertures (not illustrated) formed therein, through which the above-described first to fourth conductive lines 135a, 135b, 135c and 135d are connected to the bypass diodes (Da, Db and Dc of FIG. 6) within the junction box 200.

An AC output cable 38 may be connected to one side of the junction box 200 to externally output a power-converted AC voltage.

In addition, the photovoltaic module 50 may include a frame 105 to secure the outer rim of the solar cell module 10. To prevent the junction box 200 from protruding from the rear surface of the solar cell module 100, the thickness of the junction box 200 is preferably less than the thickness of the frame 105.

Figure 5:
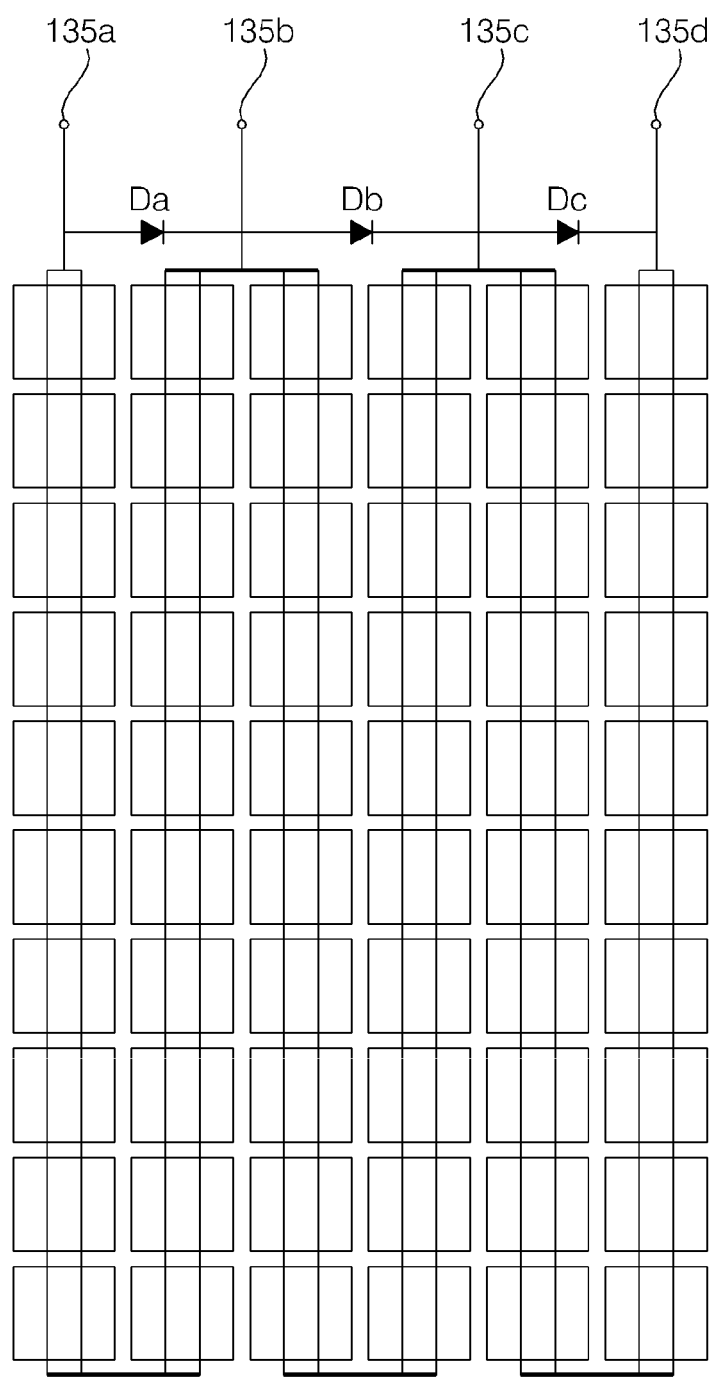
FIG. 5 is a view illustrating an exemplary arrangement of bypass diodes in the photovoltaic module of FIG. 2.

FIG. 5 is a view illustrating an exemplary arrangement of bypass diodes in the photovoltaic module of FIG. 2.

Referring to FIG. 5, the bypass diodes Da, Db and Dc may be connected to correspond to the six solar cell strings 140a, 140b, 140c, 140d, 140e and 140f. More specifically, the first bypass diode Da is connected between the first solar cell string 140a and the first bus ribbon 145a to bypass the first solar cell string 140a and the second solar cell string 140b when a reverse voltage is generated in the first solar cell string 140a or the second solar cell string 140b.

For example, when a voltage of approximately 0.6 V is generated from a normal solar cell, a potential of a cathode of the first bypass diode Da is greater than a potential of an anode of the first bypass diode Da by approximately 12 V (=0.6 V*20). That is, the first bypass diode Da performs a normal operation rather than performing a bypassing operation.

On the other hand, when a hot spot occurs at any one solar cell of the first solar cell string 140a due to shading of the solar cell or attachment of a foreign substance to the solar cell, a reverse voltage (approximately −15 V), other than a voltage of approximately 0.6 V, is generated from the solar cell. As such, the potential of the anode of the first bypass diode Da is greater than the potential of the cathode of the first bypass diode Da by approximately 15 V and the first bypass diode Da performs a bypassing operation. As a result, voltages generated by the solar cells of the first solar cell string 140a and the second solar cell string 140b are not supplied to the junction box 200. In this way, when reverse voltages are generated by some solar cells, the solar cells are bypassed, which may prevent the solar cells from being damaged. In addition, it is possible to supply a DC voltage generated from areas other than a hot spot area.

The second bypass diode Db is connected between the first bus ribbon 145a and the second bus ribbon 145b to bypass the third solar cell string 140c and the fourth solar cell string 140d when a reverse voltage is generated in the third solar cell string 140c or the fourth solar cell string 140d.

The third bypass diode Dc is connected between the six solar cell string 140f and the second bus ribbon 145b to bypass the fifth solar cell string 140e and the sixth solar cell string 140f when a reverse voltage is generated in the fifth solar cell string 140e or the sixth solar cell string 140f.

Unlike FIG. 5, six bypass diodes may be connected to correspond to the six solar cell strings and various other medications may be provided.

FIG. 6 is a block diagram illustrating an exemplary power conversion module in the junction box illustrated in FIG. 2.

Referring to FIG. 6, the power conversion module 700 in the junction box 200 may include a bypass diode unit 510, the converter unit 530, a capacitor C1, the inverter unit 540, and the controller 550.

The bypass diode unit 510 may include the bypass diodes Dc, Db and Da located respectively between the first to fourth conductive lines 135a, 135b, 135c and 135d. At this time, the number of the bypass diodes is one or more and, preferably, is less than the number of the conductive lines by one.

The bypass diodes Dc, Db and Da receive photovoltaic DC voltages from the solar cell module 50, more particularly, from the first to fourth conductive lines 135a, 135b, 135c and 135d in the solar cell module 50. Then, when the DC voltage from at least one of the first to fourth conductive lines 135a, 135b, 135c and 135d is a reverse voltage, the bypass diodes Dc, Db, Da may bypass the solar cells corresponding thereto.

Meanwhile, an input voltage Vpv having passed through the bypass diode unit 510 is input to the converter unit 530.

The converter unit 530 converts the input voltage Vpv from the bypass diode unit 510. For this reason, the converter unit 530 may be referred to as a first power conversion unit.

Figure 8A:
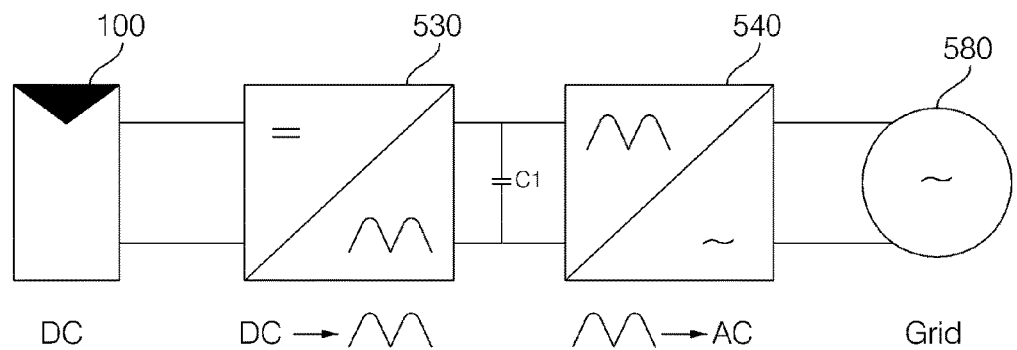
FIGS. 8A and 8B are views illustrating a method for operating the power conversion module of FIG. 6.

In one example, the converter unit 530, as exemplarily illustrated in FIG. 8A, may convert the DC input voltage Vpv into a pseudo DC voltage. As such, the pseudo DC voltage may be stored in the capacitor C1. Both terminals of the DC terminal capacitor C1 may be referred to as DC terminals, and the capacitor C1 may be referred to as a DC terminal capacitor.

Figure 8B:
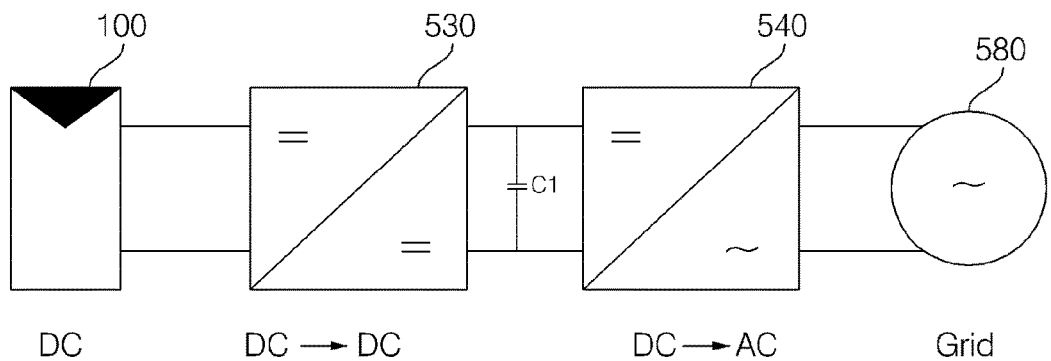

In another example, the converter unit 530, as exemplarily illustrated in FIG. 8B, may boost the DC input voltage Vpv to convert the same into a boosted DC voltage. As such, the boosted DC voltage may be stored in the DC terminal capacitor C1.

The inverter unit 540 may convert the DC voltage stored in the DC terminal capacitor C1 into an AC voltage. For this reason, the inverter unit 540 may be referred to as a second power conversion unit.

In one example, the inverter unit 540 may convert the pseudo DC voltage converted by the converter unit 530 into an AC voltage.

In another example, the inverter unit 540 may convert the boosted DC voltage from the converter unit 530 into an AC voltage.

The converter unit 530 preferably includes a plurality of interleaving converters for conversion into the pseudo DC voltage or for conversion into the boosted DC voltage.

In particular, in the embodiment of the present invention, the converter unit 530 includes three or more interleaving converters.

It is illustrated in FIG. 6 that n converters 610a, 610b, . . . , 610n are connected in parallel to one another. The n converters 610a, 610b, . . . , 610n may have the same energy conversion capacity.

A 1/N component of Current by the DC input voltage Vpv is input to each of the n converters 610a, 610b, . . . , 610n and output current of the respective converters 610a, 610b, . . . , 610n is merged into one at output terminals of the n converters 610a, 610b, . . . , 610n.

The n converters 610a, 610b, . . . , 610n perform an interleaving operation in a state in which a current phase of each of the converters 610a, 610b, . . . , 610n has a phase delay of +(360°/N), −(360°/N) relative to a reference phase, or a phase delay close thereto.

When the n converters perform an interleaving operation as described above, a ripple of input current and output current of the converter unit 530 is reduced, which advantageously results in reduction in the capacity and size of circuit elements in the power conversion module 700. In this way, the thickness of the junction box 200 may be reduced as compared to the thickness of the frame 105 of the solar cell module 100.

The interleaving converters may be tapped inductor converters or flyback converters.

Figure 7A:
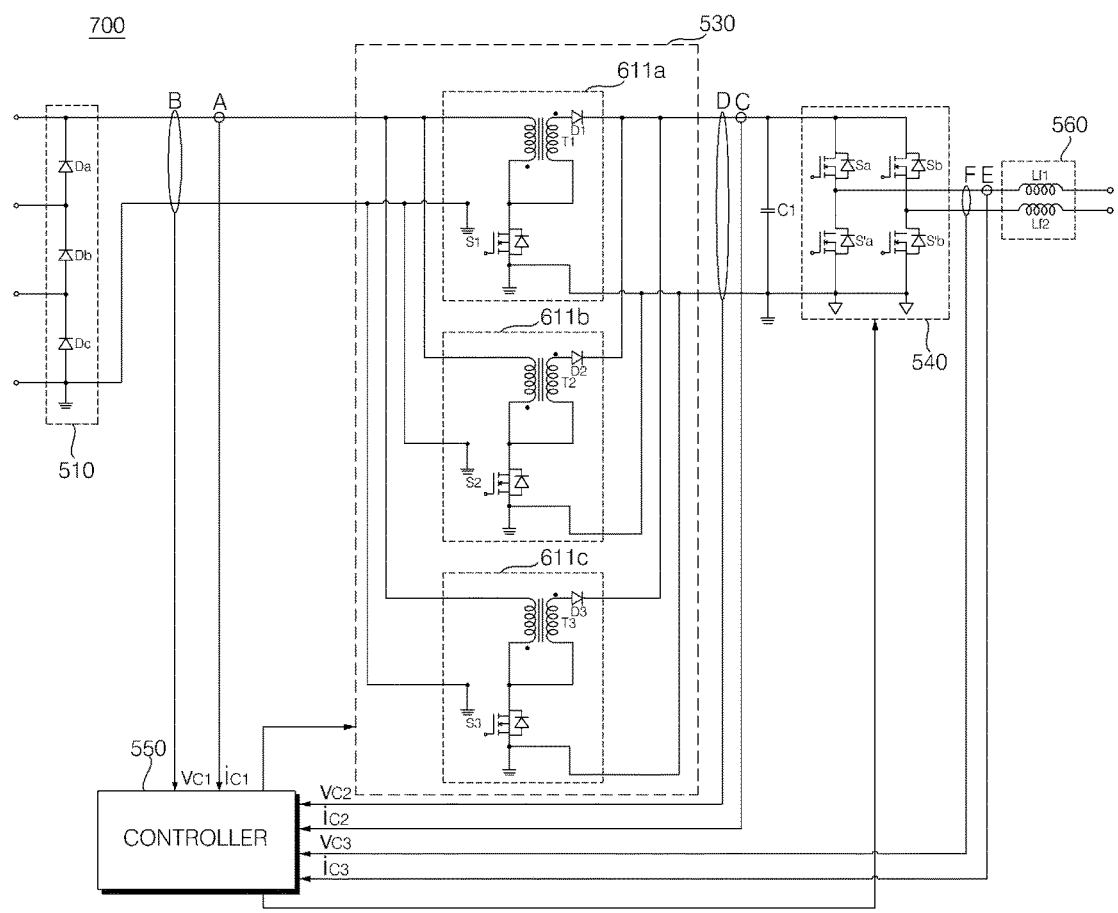
FIG. 7A is a circuit diagram illustrating an exemplary internal configuration of the power conversion module of FIG. 6.

FIG. 7A is a circuit diagram illustrating an exemplary internal configuration of the power conversion module of FIG. 6.

Referring to FIG. 7A, the power conversion module 700 may include the bypass diode unit 510, the converter unit 530, the DC terminal capacitor C1, the inverter unit 540, the controller 550, and a filter unit 560.

It is illustrated in FIG. 7A that a tapped inductor converter is used as an interleaving converter. As exemplarily illustrated in FIG. 7A, the converter unit 530 may include first to third tapped inductor converters 611a, 611b and 611c.

The bypass diode unit 510 includes the first to third bypass diodes Da, Db and Dc arranged respectively between a node a and a node b, between the node b and a node c, and between the node c and a node d. The nodes a, b, c and d respectively correspond to the first to fourth conductive lines 135a, 135b, 135c and 135d.

The converter unit 530 may perform power conversion using a DC voltage Vpv output from the bypass diode unit 510.

In particular, each of the first to third tapped inductor converters 611a, 611b and 611c outputs a converted DC voltage to the DC terminal capacitor C1 via an interleaving operation.

Among these tapped inductor converters, the first tapped inductor converter 611a includes a tapped inductor T1, a switching element S1 connected between the tapped inductor T1 and a ground terminal, and a diode D1 connected to an output terminal of the tapped inductor T1 to perform one-way conduction. The DC terminal capacitor C1 is connected between an output terminal of the diode D1, namely, a cathode and the ground terminal.

More specifically, the switching element S1 may be connected between a tap of the tapped inductor T1 and the ground terminal. The output terminal (secondary side) of the tapped inductor T is connected to an anode of the diode D1 and the DC terminal capacitor C1 is connected between the cathode of the diode D1 and the ground terminal.

Meanwhile, the primary side and secondary side of the tapped inductor T1 have opposite polarities. The tapped inductor T1 may be referred to as a switching transformer.

The primary side and secondary side of the tapped inductor T1 are connected to each other as illustrated in FIG. 7A. For this reason, the tapped inductor converter may be a non-insulated type converter.

When the three tapped inductor converters 611a, 611b and 611c are connected in parallel to one another as exemplarily illustrated in FIG. 7A so as to operate in an interleaving manner, input current is diverged in parallel, which reduces a ripple of current components output through the respective tapped inductor converters 611a, 611b and 611c.

The respective tapped inductor converters 611a, 611b and 611c may be adaptively operated to correspond to required power values of an output AC voltage.

For example, the first interleaving converter 611a may be operated alone when a required power value is within a range of approximately 90 to 130 W, both the first and second interleaving converters 611a and 611b may be operated when a required power value is within a range of approximately 190 to 230 W, and all of the first to third interleaving converters 611a, 611b and 611c may be operated when a required power value is within a range of approximately 290 to 330 W. That is, the respective tapped inductor converters 611a, 611b and 611c may be selectively operated. This selective operation may be controlled by the controller 550.

The inverter unit 540 converts a level-converted DC voltage from the converter unit 530 into an AC voltage. The inverter unit 540 is illustrated in FIG. 7A as a full-bridge inverter. That is, upper-arm switching elements Sa and Sb and lower-arm switching elements S'a and S'b connected in series are paired, and a total of two pairs of upper-arm and lower-arm switching elements Sa & S'a and Sb & S'b are connected in parallel. In addition, a diode is connected to each of the switching elements Sa, S'a, Sb and S'b in inverse parallel.

The switching elements in the inverter unit 540 are turned on/off based on an inverter switching control signal from the controller 550. As such, an AC voltage having a prescribed frequency is output from the inverter unit 540. Preferably, the output AC voltage has the same AC frequency (approximately 60 Hz to 50 Hz) as an AC frequency of a grid.

The filter unit 560 performs low pass filtering to smooth the AC voltage output from the inverter unit 540. To this end, the filter unit 560 is illustrated in FIG. 7A as including inductors Lf1 and Lf2, without being limited thereto.

A converter input current detector A detects input current ic1 to the converter unit 530, and a converter input voltage detector B detects an input voltage vc1 to the converter unit 530. The detected input current ic1 and input voltage vc1 may be input to the controller 550.

A converter output current detector C detects output current ic2 from the converter unit 530, namely, DC-terminal current, and a converter output voltage detector D detects an output voltage vc2 from the converter unit 530, namely a DC-terminal voltage. The detected output current ic2 and output voltage vc2 may be input to the controller 550.

An inverter output current detector E detects output current ic3 from the inverter unit 540, and an inverter output voltage detector F detects an output voltage vc3 from the inverter unit 540. The detected current ic3 and voltage vc3 may be input to the controller 550.

The controller 550 may output a control signal to control the switching element S1 in the converter unit 530 illustrated in FIG. 7A. In particular, the controller 550 may output a turn-on timing signal for the switching element S1 in the converter unit 530 based on at least one of the detected input current ic1, input voltage vc1, output current ic2, output voltage vc2, output current ic3 and output voltage vc3.

In addition, the controller 550 may output an inverter control signal to control each of the switching elements Sa, S'a, Sb and S'b in the inverter unit 540. In particular, the controller 550 may output a turn-on timing signal for each of the switching elements Sa, S'a, Sb and S'b in the inverter unit 540 based on at least one of the detected input current ic1, input voltage vc1, output current ic2, output voltage vc2, output current ic3 and output voltage vc3.

In addition, the controller 550 may calculate the maximum power point of the solar cell module 100 and control the converter unit 530 to output a DC voltage corresponding to the calculated maximum power.

Figure 7B:
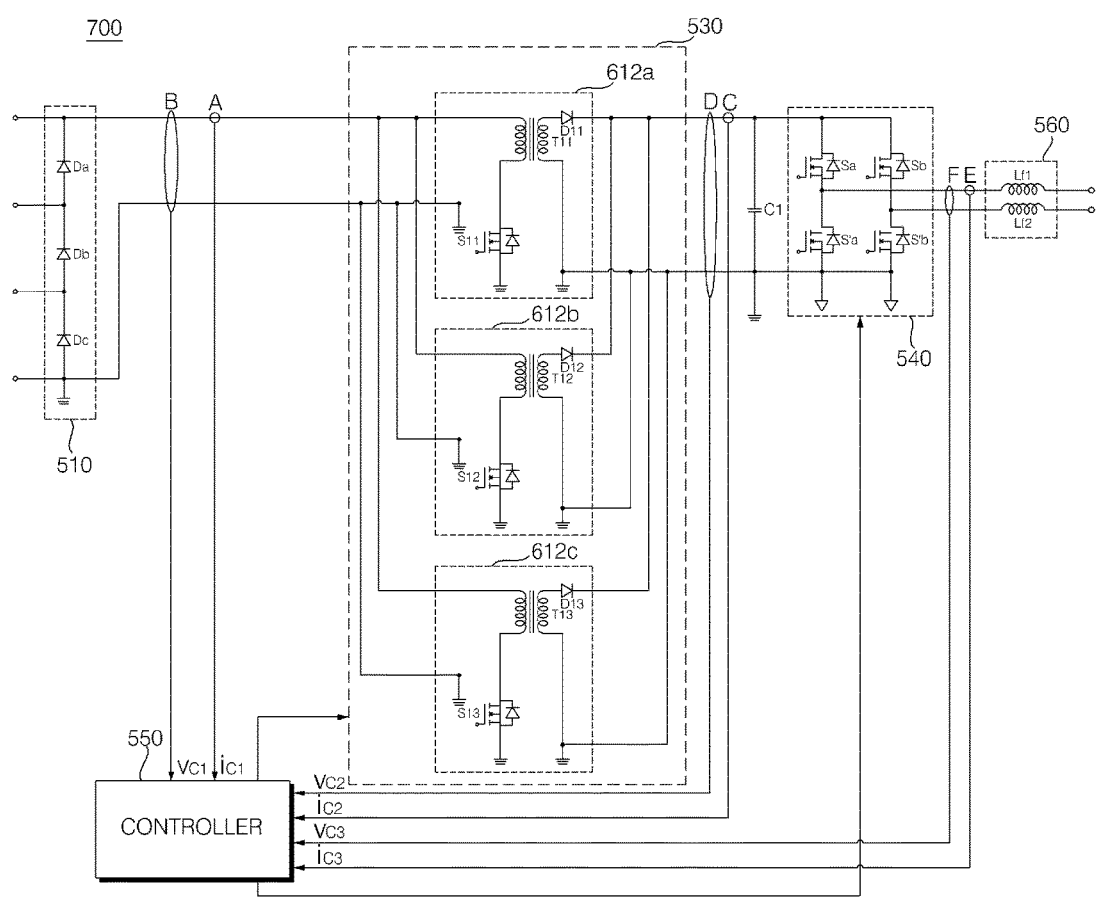
FIG. 7B is a circuit diagram illustrating another exemplary internal configuration of the power conversion module of FIG. 6.

FIG. 7B is a circuit diagram illustrating another exemplary internal configuration of the power conversion module of FIG. 6.

In the same manner as in the power conversion module 700 of FIG. 7A, the power conversion module 700 of FIG. 7B may include the bypass diode unit 510, the converter unit 530, the DC terminal capacitor C1, the inverter unit 540, the controller 550, and the filter unit 560.

However, it is illustrated in FIG. 7B that a flyback converter is used as an interleaving converter in the converter unit 530. As exemplarily illustrated in FIG. 7B, the converter unit 530 may include first to third flyback converters 612a, 612b and 612c.

In particular, the first to third flyback converters 612a, 612b and 612c are insulated type converters, unlike the non-insulated type tapped inductor converters, and each of the first to third flyback converters 612a, 612b and 612c outputs a converted DC voltage to the DC terminal capacitor C1 via an interleaving operation.

Among these flyback converters, the first flyback converter 612a includes a transformer T11, a switching element S11 connected between the primary side of the transformer T11 and a ground terminal, and a diode D11 connected to the secondary side of the transformer T11 to perform one-way conduction. The DC terminal capacitor C1 is connected between an output terminal of the diode D1, namely, a cathode and the ground terminal. The primary side and secondary side of the transformer T11 have opposite polarities.

FIGS. 8A and 8B are views illustrating a method for operating the power conversion module of FIG. 6.

Referring first to FIG. 8A, the converter unit 530 of the power conversion module 700 according to the embodiment of the present invention may convert a DC voltage from the solar cell module 100 to a pseudo DC voltage.

When the converter unit 530 includes the tapped inductor converters as exemplarily illustrated in FIG. 7A or when the converter unit 530 includes the flyback converters as exemplarily illustrated in FIG. 7B, through on/off switching of the switching element S1 or S11, the converter unit 530 may output a pseudo DC voltage having the same envelope as that of a full-wave rectified DC voltage. As such, the capacitor C1 may store the pseudo DC voltage.

The inverter unit 540 receives the pseudo DC voltage and performs a switching operation for the received pseudo DC voltage to output an AC voltage. More specifically, the inverter unit 540 may convert the pseudo DC voltage having the same envelope as that of a full-wave rectified DC voltage into an AC voltage having positive (+) and negative (−) polarities to output the AC voltage. In particular, the inverter unit 540 may convert the pseudo DC voltage into an AC voltage corresponding to a system frequency to output the AC voltage.

Next, referring to FIG. 8B, the converter unit 530 of the power conversion module 700 according to the embodiment of the present invention performs level conversion, i.e. boosting of a DC voltage from the solar cell module 100 to convert the DC voltage into a boosted DC voltage.

When the converter unit 530 includes the tapped inductor converters as exemplarily illustrated in FIG. 7A or when the converter unit 530 includes the flyback converters as exemplarily illustrated in FIG. 7B, the converter unit 530 may convert a DC voltage Vp into a boosted DC voltage through switching on/off of the switching element S1 or S11. As such, the capacitor C1 may store the boosted DC voltage.

The inverter unit 540 receives the boosted DC voltage and performs a switching operation for the received boosted DC voltage to output an AC voltage. In particular, the inverter unit 540 may convert the boosted DC voltage into an AC voltage corresponding to a system frequency to output the AC voltage.

Figure 9A:
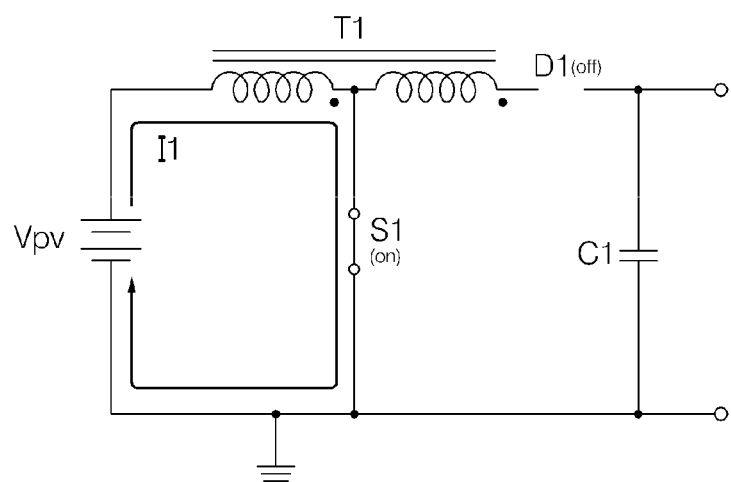
Figure 9B:
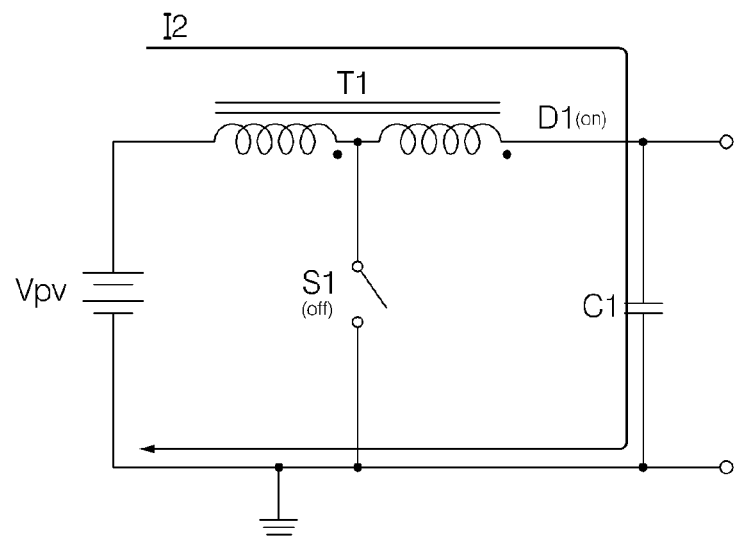

FIGS. 9A and 9B are views referred to for description of the operation of the tapped inductor converter illustrated in FIG. 7A.

Operation of the first tapped inductor converter 611a will now be described in brief. When the switching element S1 in the first tapped inductor converter 611a is turned on, as exemplarily illustrated in FIG. 9A, a closed loop is formed through the input voltage Vpv, the primary side of the tapped inductor T1, and the switching element S1, and first current I1 flows along the closed loop. At this time, the diode D1 is not electrically conducted and turned off because the secondary side of the tapped inductor T1 has an opposite polarity to that of the primary side of the tapped inductor T1.

As a result, energy based on the input voltage Vpv is stored in the primary side of the tapped inductor T1.

Next, when the switching element S1 is turned off, as exemplarily illustrated in FIG. 9B, a closed loop is formed through the input voltage Vpv, the primary side and secondary side of the tapped inductor T1, the diode D1, and the capacitor C1, and second current I2 flows along the closed loop. That is, the diode D1 is electrically conducted because the secondary side of the tapped inductor T1 has an opposite polarity to that of the primary side of the tapped inductor T1. As a result, the input voltage Vpv and energy stored in the primary side and secondary side of the tapped inductor T1 may be stored in the capacitor C1 through the diode D1.

In this manner, the converter unit 530 may output a pseudo DC voltage or a DC voltage of high efficiency and high level using the input voltage Vpv and the energy stored in the primary side and secondary side of the tapped inductor T1.

Figure 10A:
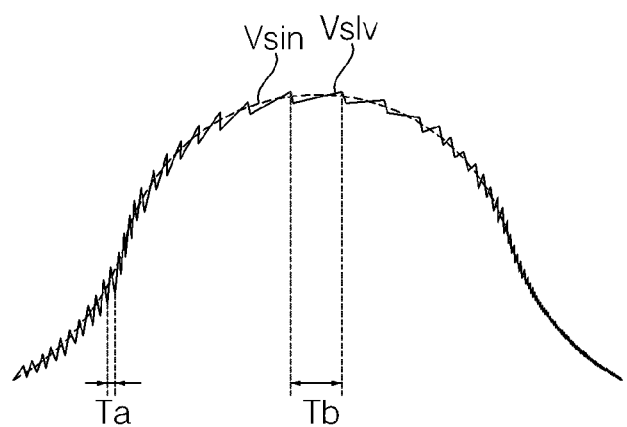
FIGS. 10A and 10B are views referred to for description of output of a pseudo DC voltage using an input voltage from a converter unit illustrated in FIG. 6.
Figure 10B:
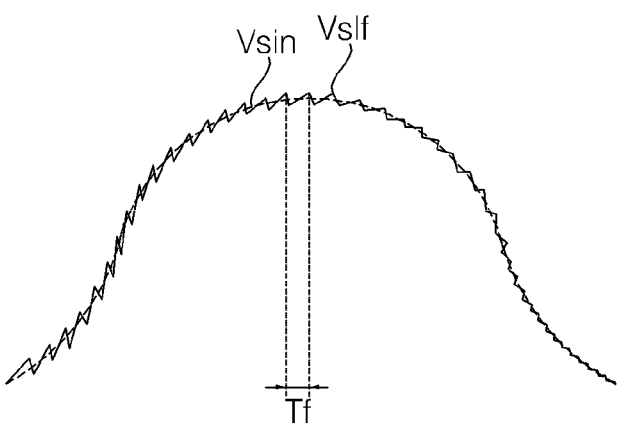

FIGS. 10A and 10B are views referred to for description of output of a pseudo DC voltage using an input voltage from the converter unit illustrated in FIG. 6.

Referring to FIGS. 6 and 10A, each of the first to third interleaving converters 610a, 610b and 610c in the converter unit 530 outputs a pseudo DC voltage using an input DC voltage Vpv.

More specifically, the converter unit 530 outputs a pseudo DC voltage having a peak value of approximately 330 V using a DC voltage within a range of approximately 32 to 36 V from the solar cell module 100.

To this end, the controller 550 determines duties of the switching elements in the first to third interleaving converters 610a, 610b and 610c based on the detected input voltage Vpv and a target output voltage Vdc.

In particular, as the input voltage Vpv is reduced, the duties of the switching elements in the first to third interleaving converters 610a, 610b and 610c are increased. As the input voltage Vpv is increased, the duties of the switching elements in the first to third interleaving converters 610a, 610b and 610c are reduced.

In addition, as the target output voltage Vdc is reduced, the duties of the switching elements in the first to third interleaving converters 610a, 610b and 610c are reduced. As the target output voltage Vdc is increased, the duties of the switching elements in the first to third interleaving converters 610a, 610b and 610c are increased. For example, the duties of the switching elements may become the maximum when the target output voltage Vdc has a peak value of approximately 330 V.

In FIG. 10A, a pseudo DC voltage waveform Vslv output by duty variation as described above is illustrated. The pseudo DC voltage waveform is illustrated in FIG. 10A as following a target sinusoidal waveform Vsin.

In the present invention, to allow a pseudo DC voltage waveform Vslo to more accurately follow a full-wave rectified waveform Vsin, the switching frequency of the converter unit 530 is varied.

As exemplarily illustrated in FIG. 10B, an error ΔE2 between a pseudo DC voltage waveform Vslf and the target sinusoidal waveform Vsin when the switching frequency of the converter unit 530 is fixed is greater than an error ΔE1 between the pseudo DC voltage waveform Vslv and the target sinusoidal waveform Vsin when the switching frequency of the converter unit 530 is varied as illustrated in FIG. 10A.

To reduce the above-described error, in the present invention, the switching frequency of the converter unit 530 is varied. That is, the switching frequencies of the switching elements in the first to third interleaving converters 610a, 610b and 610c may be varied.

The controller 550 may control the converter unit 530 in such a manner that the switching frequency of the converter unit 530 is increased, namely, the switching period of the converter unit 530 is reduced as a change rate of the target sinusoidal waveform Vsin increases, and that the switching frequency of the converter unit 530 is reduced, namely, the switching period of the converter unit 530 is increased as a change rate of the target sinusoidal waveform Vsin is reduced.

As exemplarily illustrated in FIG. 10A, the switching period of the converter unit 530 is set to Ta in a rising section of the target sinusoidal waveform Vsin, and the switching period of the converter unit 530 is also set to Tb which is greater than Ta, in a peak section of the target sinusoidal waveform Vsin. That is, it is illustrated in FIG. 10A that the switching frequency corresponding to the switching period Ta is greater than the switching frequency corresponding to the switching period Tb. This setting may reduce the error ΔE1 between the pseudo DC voltage waveform Vslv and the target sinusoidal waveform Vsin.

The switching frequency variation of FIG. 10A may be described using a switching mode of the switching element. This will be described below with reference to FIGS. 11 and 12.

Figure 11:
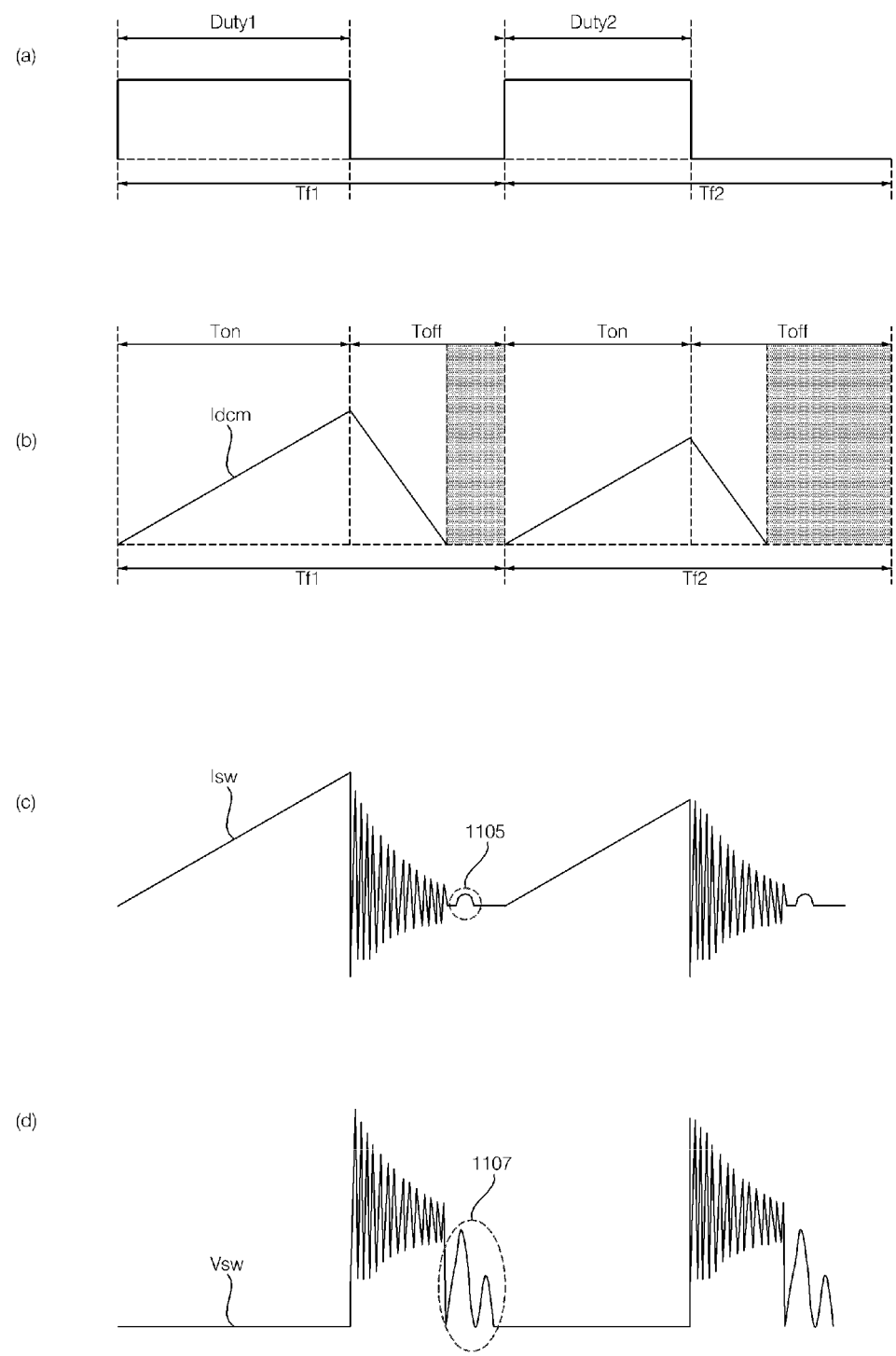
FIGS. 11 and 12 are views referred to for description of switching frequency variation depending on a switching mode of a switching element.
Figure 12:
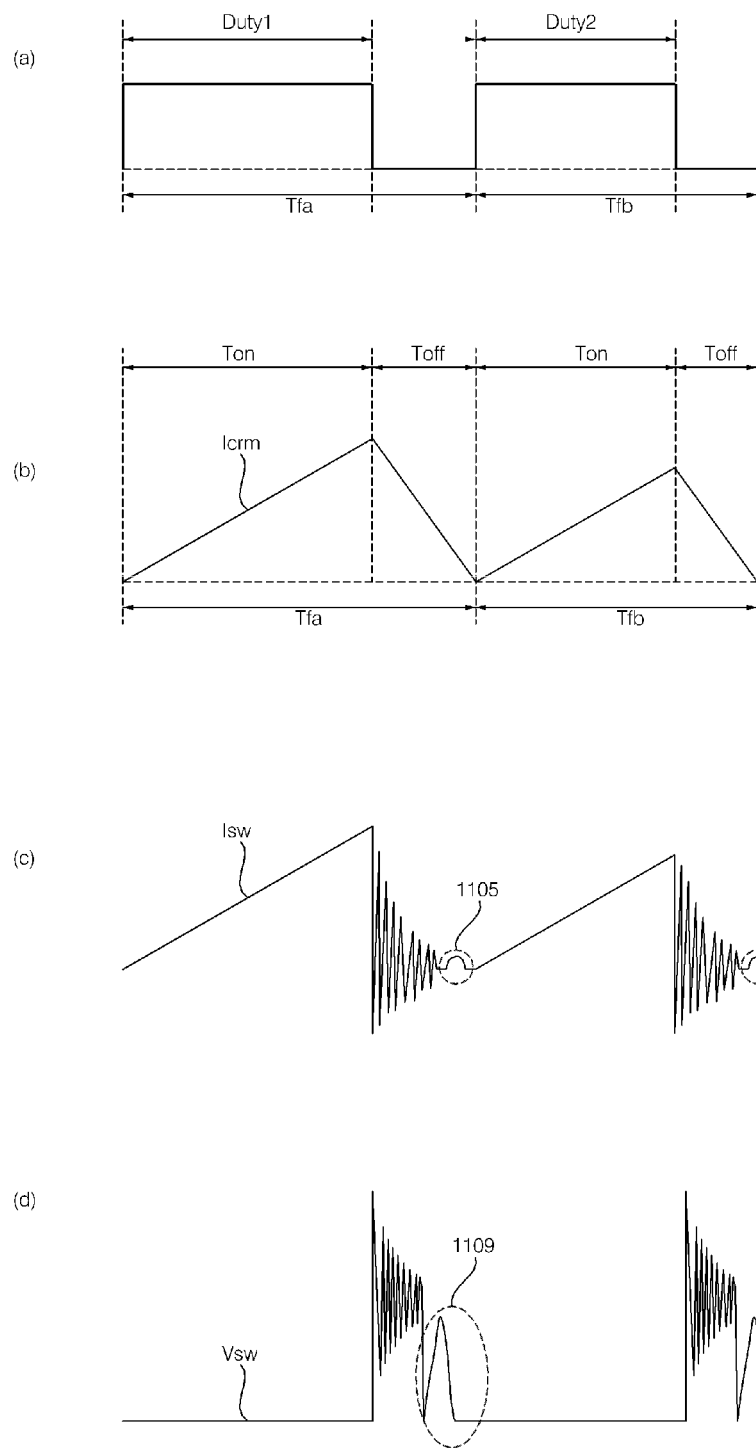

FIGS. 11 and 12 are views referred to for description of switching frequency variation depending on the switching mode of the switching element.

In (a) of FIG. 11, an exemplary duty waveform diagram of the switching element in the interleaving converter is illustrated. Referring to (a) of FIG. 11, the switching element is turned on during a first duty Duty1 within a first switching period Tf1 and thereafter turned off. Then, the switching element is turned on during a second duty Duty2 within a second switching period Tf2 and thereafter turned off. It is illustrated in (a) of FIG. 11 that the first duty Duty1 is greater than the second duty Duty2.

In addition, it is illustrated in (a) of FIG. 11 that the switching period of the interleaving converter is fixed and a discontinuous conduction mode (DCM) is applied as the switching mode.

When the switching period of the interleaving converter is fixed and the DCM is applied as the switching mode, a waveform Idcm of current flowing through the switching element may be exemplified as illustrated in (b) of FIG. 11. Current flowing through the switching element is increased as the switching element is turned on and is reduced as the switching element is turned off.

In (c) of FIG. 11, a waveform of real current flowing through the switching element in the interleaving converter depending on the DCM is illustrated, and in (d) of FIG. 11, a switching voltage at both terminals of the switching element in the interleaving converter depending on the DCM is illustrated.

Meanwhile, a resonance section 1105 in the interleaving converter may occur after the switching element is turned off and before a next switching period is commenced. At this time, when the switching element is operated in the DCM, a section 1107 in which a switching voltage at both terminals of the switching element does not become zero occurs. Accordingly, zero voltage switching (ZVS) with respect to the switching element cannot be performed, which causes deterioration in the efficiency of the interleaving converter. In addition, under non-implementation of the zero voltage switching, an AC voltage output through the inverter unit 540 has an increased high frequency component and thus has difficulty in satisfying a harmonic standard.

To solve the above-described problem, in the present invention, a critical conduction mode (CRM) other than the DCM is used as the switching mode. The CRM may be referred to as a boundary conduction mode (BCM) or a transition mode (TM).

The CRM refers to a mode in which a new switching period is commenced whenever a voltage or current flowing through the switching element becomes zero after the switching element of the interleaving converter is turned off. That is, through the CRM method, the switching period may be varied according to the duty within the switching period.

In (a) of FIG. 12, an exemplary duty waveform diagram of the switching element in the interleaving converter is illustrated. Referring to (a) of FIG. 12, the switching element is turned on during a first duty Duty1 within a first switching period Tfa and thereafter turned off. Then, the switching element is turned on during a second duty Duty2 within a second switching period Tfb and thereafter turned off. It is illustrated in (a) of FIG. 12 that the first duty Duty1 is greater than the second duty Duty2.

In addition, it is illustrated in (a) of FIG. 12 that the CRM using the varied switching frequency is applied as the switching mode of the switching element in the interleaving converter according to variation in duty.

When the CRM using the varied switching frequency is applied as the switching mode, a waveform Icrm of current flowing through the switching element may be exemplified as illustrated in (b) of FIG. 12. Current flowing through the switching element is increased as the switching element is turned on and is reduced as the switching element is turned off. When current flowing through the switching element or a voltage at both terminals of the switching element becomes zero, namely, when the zero crossing arrives, a new switching period is commenced.

In (c) of FIG. 12, a waveform of real current flowing through the switching element in the interleaving converter depending on the CRM is illustrated, and in (d) of FIG. 12, a switching voltage at both terminals of the switching element in the interleaving converter depending on the CRM is illustrated.

Meanwhile, the resonance section 1105 in the interleaving converter may occur after the switching element is turned off. At this time, when the switching element is operated in the CRM, despite occurrence of the resonance section 1105, a timing when current flowing through the switching element or a voltage at both terminals of the switching element becomes zero, namely, a timing when the zero crossing arrives, may be determined and the switching element may be turned on at the corresponding timing. That is, a new switching period may be commended. As a result, zero voltage switching (ZVS) or zero current switching (ZCS) with respect to the switching element may be performed, which enhances the efficiency of the interleaving converter.

In this way, in the present invention, the switching frequency of the switching element in the interleaving converter is varied based on the CRM.

The above-described CRM method may be applied to all cases in which the converter unit 530 includes a plurality of interleaving converters. For example, the CRM method may be applied when the converter unit 530 includes two interleaving converters and may be applied when the converter unit 530 includes three interleaving converters.

Meanwhile, the CRM method as described above may be controlled by the controller 550 in the power conversion module 700.

The controller 550 in the power conversion module 700 varies the switching frequencies of the respective interleaving converters in the power conversion module 700.

For example, when the converter unit 530 in the power conversion module 700 performs power conversion of a DC voltage to output a pseudo DC voltage, the controller 550 in the power conversion module 700 may vary switching periods of the switching elements in the interleaving converters based on duties for operation of the switching elements in the interleaving converters. At this time, the switching periods may be increased as the duties are increased.

In addition, the controller 550 in the power conversion module 700 may control the converter unit 530 to allow an output pseudo DC voltage to follow a target sinusoidal waveform. At this time, the controller 550 in the power conversion module 700 may set the converter unit 530 in such a manner that the switching period of the converter unit 530 is reduced as a change rate of the target sinusoidal waveform is increased.

In addition, the controller 550 in the power conversion module 700 may vary the switching period of the switching elements in the interleaving converters, based on whether current flowing through the switching element or a voltage at both terminals of the switching element corresponds to the zero crossing, after the switching elements are turned on and turned off, in order to accomplish zero current switching or zero voltage switching with respect to the switching elements in the interleaving converters.

In particular, the controller 550 in the power conversion module 700 may calculate a zero crossing timing of current flowing through the switching element or a voltage at both terminals of the switching element, based on the input voltage detected by the input voltage detector A and the DC terminal voltage detected by the DC terminal voltage detector, namely, the output voltage from the converter unit 530, after the switching elements in the interleaving converters are turned on and turned off. Then, the controller 550 may vary the switching periods of the switching elements based on the zero crossing timing. In this way, the controller 550 in the power conversion module 700 may simply calculate the zero crossing timing.

For example, the controller 550 in the power conversion module 700 may set the switching elements in the interleaving converters in such a manner that the duties of the switching elements are increased and, consequently, the switching periods of the switching elements are increased as the detected input voltage Vpv is reduced. Conversely, the controller 550 in the power conversion module 700 may set the switching elements in the interleaving converters in such a manner that the duties of the switching elements are reduced and, consequently, the switching periods of the switching elements are reduced as the detected input voltage Vpv is increased.

The controller 550 in the power conversion module 700 may set the switching elements in the interleaving converters in such a manner that the duties of the switching elements are increased and, consequently, the switching periods of the switching elements are increased as the detected output voltage Vdc is reduced compared to a target output voltage. Conversely, the controller 550 in the power conversion module 700 may set the switching elements in the interleaving converters in such a manner that the duties of the switching elements are reduced and, consequently, the switching periods of the switching elements are reduced as the detected output voltage Vdc is increased compared to the target output voltage.

In addition, the controller 550 in the power conversion module 700 may turn on the switching elements in the interleaving converters at a predicted zero crossing timing. As a result, zero voltage switching (ZVS) or zero current switching (ZCS) with respect to the switching elements may be performed, which enhances the efficiency of the interleaving converters.

Meanwhile, when the three interleaving converters 610a, 610b and 610c are used as exemplarily illustrated in FIG. 6, the first to third interleaving converters 610a, 610b and 610c may be operated while having phase differences respectively.

At this time, when a constant phase difference, e.g., 120 degrees, is set with respect to operating sections of the first to third interleaving converters 610a, 610b and 610c under the application of switching frequency variation, output power may be deteriorated when the switching periods are increased. This will be described below with reference to FIGS. 14 and 15.

Figure 13:
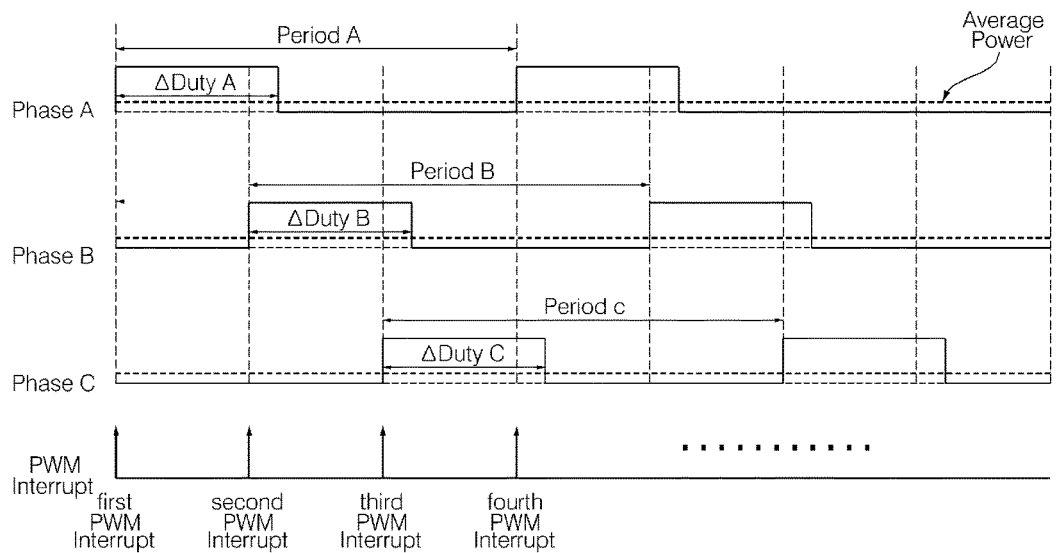
FIG. 13 is a view illustrating the case in which three interleaving converters have fixed switching frequencies.

FIG. 13 is a view illustrating the case in which the three interleaving converters 610a, 610b and 610c have fixed switching frequencies.

Referring to FIG. 13, it can be seen that the three interleaving converters 610a, 610b and 610c respectively have switching periods Period A, Period B and Period C, all of which are the same, and phase differences that are differences between operating sections of the three interleaving converters 610a, 610b and 610c are constant.

The operating sections of the three interleaving converters 610a, 610b and 610c are respectively partial sections ΔDuty A, ΔDuty B and ΔDuty C within the respective switching periods. The operating sections of the three interleaving converters 610a, 610b and 610c may be commenced by PWM interruption signals.

At this time, when duties in the operating sections of the three interleaving converters 610a, 610b and 610c are the same, as exemplarily illustrated in FIG. 13, the three interleaving converters 610a, 610b and 610c have the same average power.

That is, when the switching frequencies of the three interleaving converters 610a, 610b and 610c are fixed and the phase differences of the three interleaving converters 610a, 610b and 610c are fixed, the three interleaving converters 610a, 610b and 610c advantageously have approximately the same average power.

On the other hand, when the switching frequencies of the three interleaving converters 610a, 610b and 610c are varied and the phase difference of the switching frequencies of the three interleaving converters 610a, 610b and 610c are fixed, output power may be instantaneously deteriorated. This will be described below with reference to FIG. 14.

Figure 14:
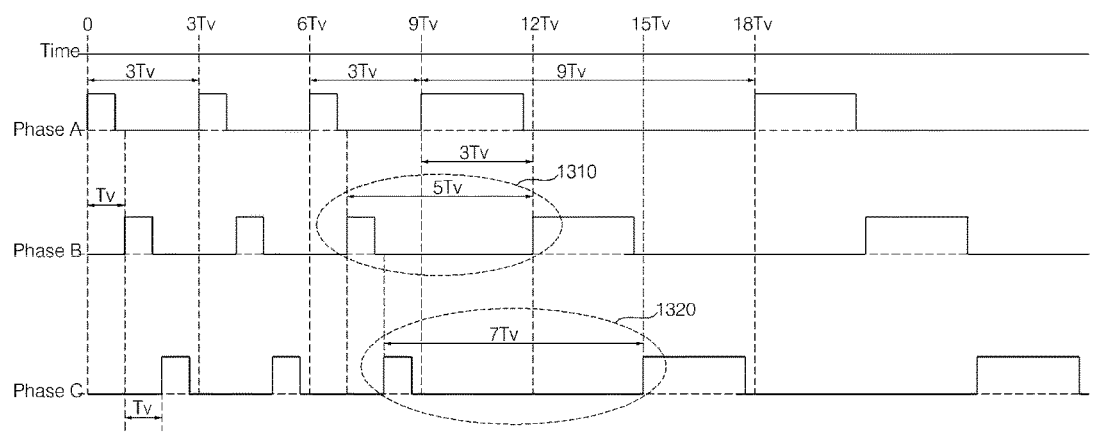
FIG. 14 is a view illustrating the case in which three interleaving converters have varied switching frequencies and fixed phase differences.

FIG. 14 is a view illustrating the case in which the three interleaving converters 610a, 610b and 610c have varied switching frequencies and fixed phase differences.

Referring to FIG. 14, it can be seen that the switching periods of the three interleaving converters 610a, 610b and 610c are fixed to 3 Tv within a range from a point in time of 0 to a point in time of 9 Tv and differences of the phases Phase A, Phase B and Phase C of the three interleaving converters 610a, 610b and 610c are fixed to 1 Tv.

It is illustrated that the switching periods of the three interleaving converters 610a, 610b and 610c are varied at the point in time of 9 Tv so as to be increased, by three times, to 9 Tv. In this case, the first interleaving converter is operated during a time section of 3 Tv after the previous switching period of 3 Tv, whereas the second interleaving converter is operated during a time section of 3 Tv after a time section of 5 Tv has passed from the previous switching period in consideration of the varied duty (3 Tv) of the first interleaving converter. The third interleaving converter is also operated during a time section of 3 Tv after a time section of 7 Tv has passed from the previous switching period in consideration of the varied duty 3 Tv of the second interleaving converter.

At this time, the phase differences of the first interleaving converter to the third interleaving converter 610a, 610b and 610c are respectively fixed to 120 degrees despite switching period variation. That is, the first interleaving converter is operated and then the second interleaving converter is operated after a time section of 3 Tv. In addition, the first interleaving converter is operated and then the third interleaving converter is operated after a time section of 6 Tv.

In switching period variation sections 1310 and 1320 as described above, power output by each of the second interleaving converter and the third interleaving converter is reduced as compared to the first interleaving converter. As a result, output current or output voltage of the converter unit 530 is instantaneously deteriorated.

To solve this problem, in the embodiment of the present invention, upon variation in the switching periods of the interleaving converters, phases of the operating sections of the interleaving converters are varied in order to avoid output unbalance between the interleaving converters. This will be described below with reference to FIG. 15.

Figure 15:
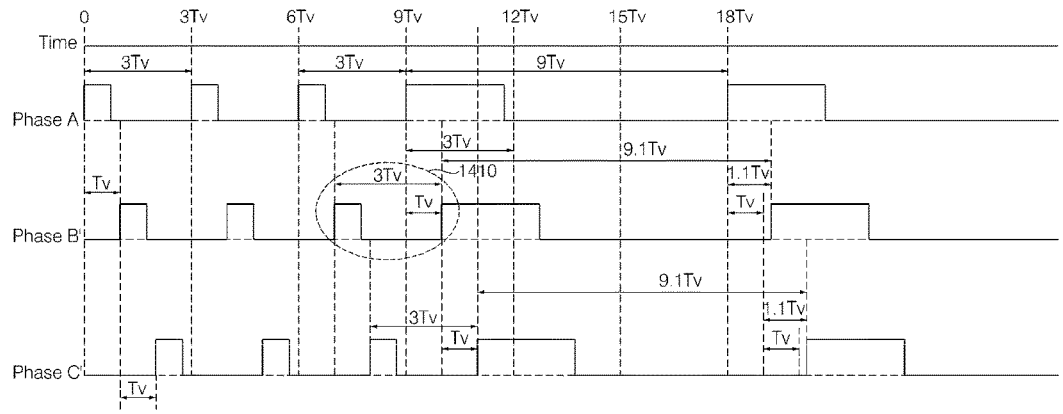
FIG. 15 is a view illustrating the case in which three interleaving converters have varied switching frequencies and varied phase differences.

FIG. 15 is a view illustrating the case in which the three interleaving converters 610a, 610b and 610c have varied switching frequencies and varied phase differences.

Referring to FIG. 15, it can be seen that the switching periods of the three interleaving converters 610a, 610b and 610c are fixed to 3 Tv within a range from a point in time of 0 to a point in time of 9 Tv and differences of the phases Phase A, Phase B and Phase C of the three interleaving converters 610a, 610b and 610c are fixed to 1 Tv.

It is illustrated that the switching periods of the three interleaving converters 610a, 610b and 610c are varied at the point in time of 9 Tv so as to be increased, by three times, to 9 Tv. In this case, while the first interleaving converter is operated during a time section of 3 Tv after the previous switching period of 3 Tv, in a switching period variation section 1410, the second interleaving converter may be operated during a time section of 3 Tv after a time section of 1 TV has passed from the switching period variation point in time of 9 Tv and the third interleaving converter may be operated during a time section of 3 Tv after a time section of 2 Tv has passed from the switching period variation point in time of 9 Tv.

That is, unlike FIG. 14, the controller 550 varies phase differences of the first interleaving converter to the third interleaving converter 610a, 610b and 610c to correspond to the varied switching periods. As illustrated in FIG. 15, the phase difference between the first interleaving converter 610a and the second interleaving converter 610b and the phase difference between the second interleaving converter 610b and the third interleaving converter 610c are varied from 120 degrees to 40 degrees.

The controller 550 may vary the phases of the first to third interleaving converters 610a, 610b and 610c to reduce the phase differences between the respective interleaving converters 610a, 610b and 610c when the switching periods of the first to third interleaving converters 610a, 610b and 610c are increased. Similarly, the controller 550 may vary the phases of the first to third interleaving converters 610a, 610b and 610c to increase the phase differences between the respective interleaving converters 610a, 610b and 610c, for example, from 120 degrees to 130 degrees when the switching periods of the first to third interleaving converters 610a, 610b and 610c are reduced.

In addition, the controller 550 may vary the phases of the first to third interleaving converters 610a, 610b, and 610c, more particularly, increase the phases of the first to third interleaving converters 610a, 610b, and 610c to generate an overlapping region between the operating sections of the interleaving converters when the switching periods of the three interleaving converters 610a, 610b, and 610c are increased. It is illustrated in FIG. 15 that the operating sections of the first interleaving converter and the second interleaving converter overlap during a time section of approximately 2 Tv.

After the switching period variation, at a point in time of 18 Tv, the first interleaving converter is operated during a time section of 3 Tv after a time section of 9 Tv has passed from the previous switching period. On the other hand, the second interleaving converter may be operated during a time section of 3 Tv after a time section of 9.1 Tv has passed from the previous switching period, and the third interleaving converter may be operated during a time section of 3 TV after a time section of 9.1 Tv has passed from the previous switching period.

After the varied switching periods of the three interleaving converters 610a, 610b and 610c, the controller 550 may sequentially vary phase differences between the first to third interleaving converters 610a, 610b and 610c so that the phase differences between the respective interleaving converters 610a, 610b and 610c are close to a reference phase difference. It can be seen from FIG. 15 that the phase difference between the first interleaving converter 610a and the second interleaving converter 610b and the phase difference between the second interleaving converter 610b and the third interleaving converter 610c are increased from 40 degrees to approximately 41 degrees after the point in time of 18 Tv.

As the phase differences between the first to third interleaving converters 610a, 610b, and 610c are sequentially varied so as to be close to an original reference phase difference, i.e. 120 degrees as described above, current distortion may be prevented and the above-described output power deterioration of the second interleaving converter and the third interleaving converter may be prevented.

The phase variation as described above may be applied to the case in which at least three interleaving converters are used. When two interleaving converters are used, phases of the interleaving converters are preferably fixed to 180 degrees as exemplarily illustrated in FIG. 12.

The switching frequency variation and phase variation as described above with reference to FIGS. 10A to 15 may be applied to the converter unit 530 and, in particular, may be applied when the converter unit 530 includes tapped inductor converters as illustrated in FIG. 7A or when the converter unit 530 includes flyback converters as illustrated in FIG. 7B.

In addition, the switching period variation of the interleaving converters in the power conversion module 700 as described above may be applied to a power conversion module 701 or 702 as exemplarily illustrated in FIGS. 18 to 21B, in addition to the photovoltaic system 10 of FIG. 1.

Meanwhile, according to the embodiment of the present invention, a voltage clamp unit to clamp a surge voltage in the converter unit is preferably used.

Figure 16A:
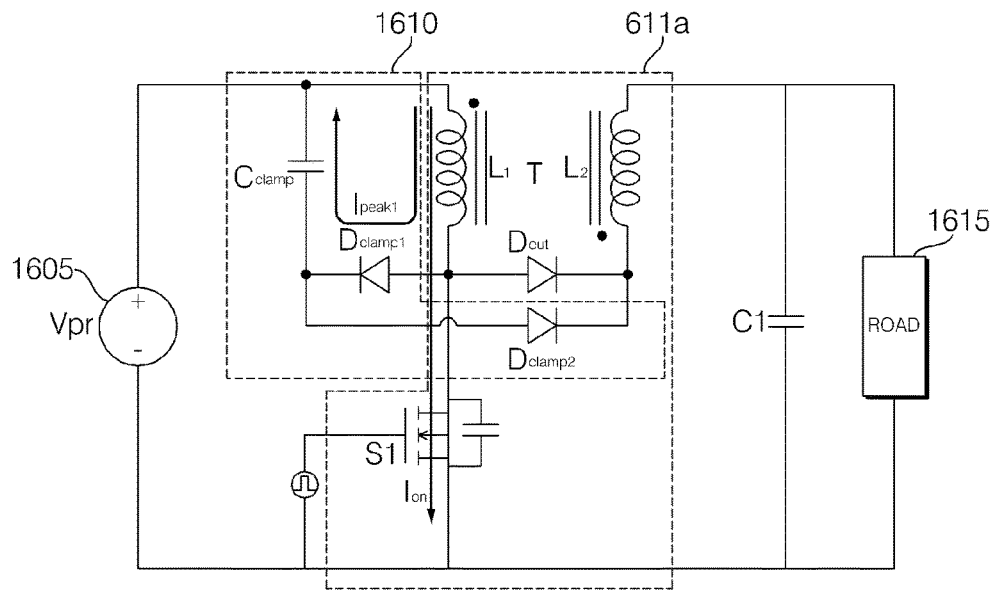
FIGS. 16A and 16B are views illustrating an exemplary clamp unit according to an embodiment of the present invention.
Figure 17A:
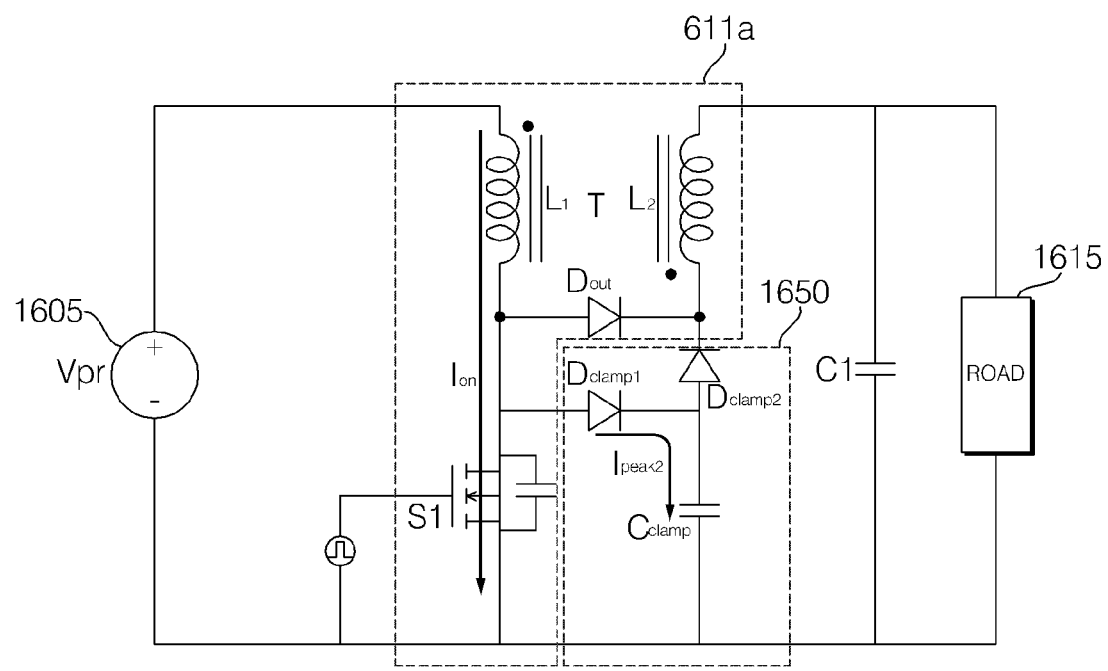
FIGS. 17A and 17B are views illustrating another exemplary clamp unit according to an embodiment of the present invention.

To this end, the power conversion module 700 (see FIG. 6) preferably includes the converter unit 530 (see FIG. 6), the clamp unit 1610 (see FIG. 16A) or 1650 (see FIG. 17A)

to limit a surge voltage in the converter unit 530 (see FIG. 6), and the controller 550 (see FIG. 6) to control the converter unit 530 (see FIG. 6).

The converter unit 530 may include the primary side inductor $L_1$ (see FIG. 16A), the secondary side inductor $L_2$ (see FIG. 16A), and the switching element S1 (see FIG. 16a) connected between the primary side inductor $L_1$ (see FIG. 16A) and the ground terminal.

Figure 16B:
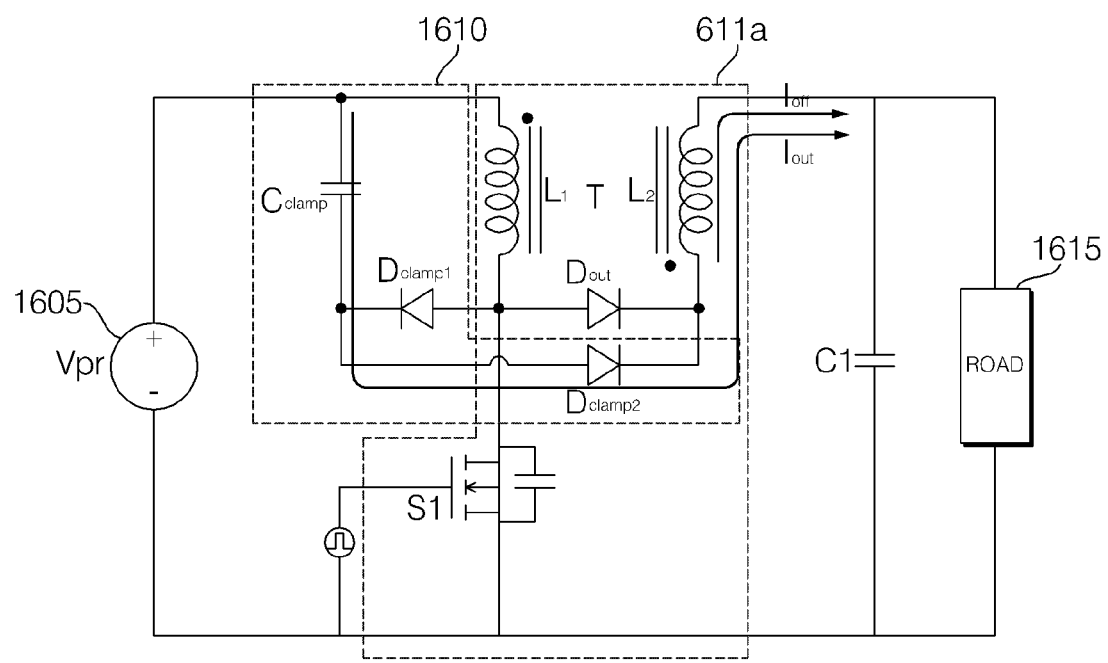

In particular, the converter unit 530, as exemplarily illustrated in FIGS. 16A and 16B, may include the tapped inductor converter 611a (see FIG. 16A) which includes the primary side inductor $L_1$ (see FIG. 16A), the secondary side inductor $L_2$ (see FIG. 16A), the switching element S1 (see FIG. 16A), and an output diode $D_{out}$ (see FIG. 16a).

Alternatively, the converter unit 530 may include a flyback converter including a primary side inductor, a secondary side inductor, and a switching element.

The following description focuses on the case in which the converter unit 530 includes the tapped inductor converter.

FIGS. 16A and 16B are views illustrating an exemplary clamp unit according to an embodiment of the present invention.

Referring to FIGS. 16A and 16B, the tapped inductor converter 611a may include the primary side inductor $L_1$ and the secondary side inductor $L_2$ to receive a photovoltaic voltage Vpr, the switching element S1 connected between the primary side inductor $L_1$ and the ground terminal, and the output diode $D_{out}$ connected between the primary side inductor $L_1$ and the secondary side inductor $L_2$.

The clamp unit 1610 may include the first clamp diode $D_{clamp1}$ having one terminal connected between the primary side inductor $L_1$ and the switching element S1, the clamp capacitor $C_{clamp}$ connected between the other terminal of the first clamp diode $D_{clamp1}$ and an input terminal of the primary side inductor $L_1$, and the second clamp diode $D_{clamp2}$ connected between the other terminal of the first clamp diode $D_{clamp1}$ and the secondary side inductor $L_2$.

The tapped inductor converter 611a stores energy in the primary side inductor $L_1$ as the switching element S1 is turned on and outputs the energy stored in the primary side inductor $L_1$ through the secondary side inductor $L_2$ and the output diode $D_{out}$ as the switching element S1 is turned off.

When the switching element S1 is turned on or turned off, a surge voltage is generated. In the present invention, the surge voltage is limited using the clamp unit 1610.

The clamp unit 1610 stores a surge voltage generated when the switching element S1 is turned on or turned off in the clamp capacitor $C_{clamp}$ through the first clamp diode $D_{clamp1}$. Then, the clamp unit 1610 outputs the surge voltage stored in the clamp capacitor $C_{clamp}$ through the second clamp diode $D_{clamp2}$ when the switching element S1 is turned off.

It is illustrated in FIG. 16A that current $I_{on}$ flows through the primary side inductor $L_1$ and the switching element S1 as the switching element S1 is turned on. As a result, energy is stored in the primary side inductor $L_1$.

When the switching element S1 is turned off, a surge voltage may be generated due to rapid variation. At this time, the primary side inductor $L_1$, the first clamp diode $D_{clamp1}$, and the clamp capacitor $C_{clamp}$ may constitute a closed loop, causing peak current $I_{peak1}$ to flow therethrough. As a result, the surge voltage is stored in the clamp capacitor $C_{clamp}$ through the primary side inductor $L_1$ and the first clamp diode $D_{clamp1}$.

After the switching element S1 is turned off, as exemplarily illustrated in FIG. 16B, the energy stored in the primary side inductor $L_1$ is output through the output diode $D_{out}$ and the secondary side inductor $L_2$. Output current $I_{off}$ is illustrated in FIGS. 16A and 16B as flowing through the output diode $D_{out}$ and the secondary side inductor $L_2$.

In addition, after the switching element S1 is turned off, the surge voltage stored in the clamp capacitor $C_{clamp}$ is output through the second clamp diode $D_{clamp2}$. Clamp current $I_{out}$ is illustrated in FIG. 16B as flowing through the clamp capacitor $C_{clamp}$ and the second clamp diode $D_{clamp2}$.

Figure 17B:
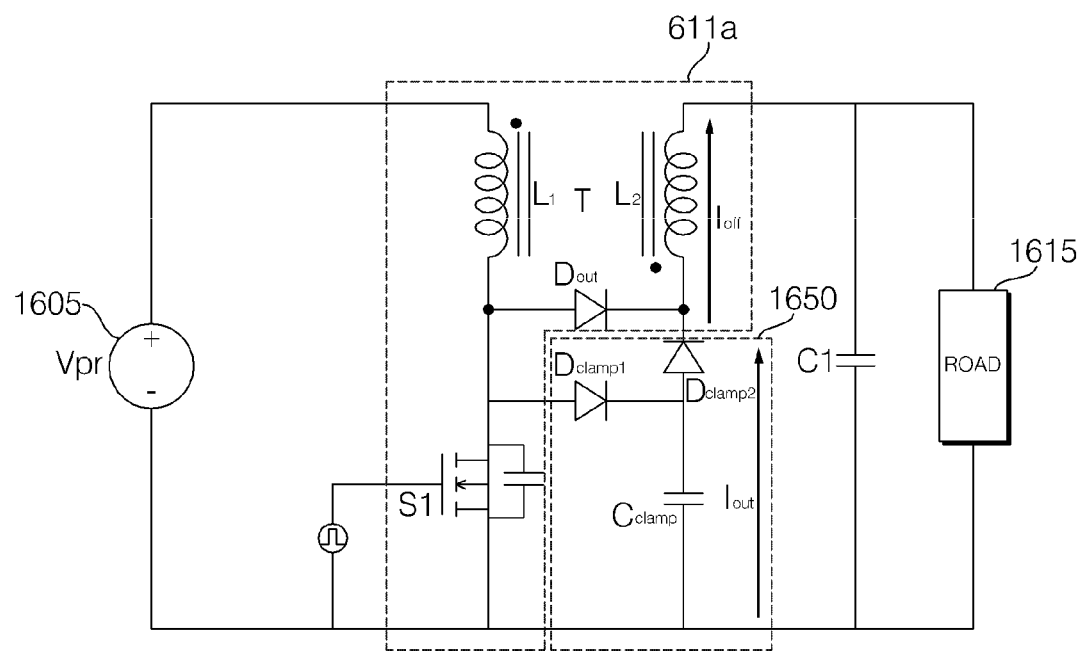

FIGS. 17A and 17B are views illustrating another exemplary clamp unit according to an embodiment of the present invention.

The tapped inductor converter 611a of FIGS. 17A and 17B is substantially identical to the tapped inductor converter 611a of FIGS. 16A and 16B except for a position of the clamp unit 1650.

The clamp unit 1650 may include the first clamp diode $D_{clamp1}$ having one terminal connected between the primary side inductor $L_1$ and the switching element S1, the clamp capacitor $C_{clamp}$ connected between the other terminal of the first clamp diode $D_{clamp1}$ and the ground terminal, and the second clamp diode $D_{clamp2}$ connected between the other terminal of the first clamp diode $D_{clamp1}$ and the secondary side inductor $L_2$ of the tapped inductor T.

The clamp unit 1650 stores a surge voltage generated when the switching element S1 is turned on or turned off in the clamp capacitor $C_{clamp}$ through the first clamp diode $D_{clamp1}$. Then, the clamp unit 1650 outputs the surge voltage stored in the clamp capacitor $C_{clamp}$ through the second clamp diode $D_{clamp2}$ when the switching element S1 is turned off.

It is illustrated FIG. 17A that current $I_{on}$ flows through the primary side inductor $L_1$ and the switching element S1 as the switching element S1 is turned on. As a result, energy is stored in the primary side inductor $L_1$.

When the switching element S1 is turned off, a surge voltage may be generated due to rapid variation. At this time, the primary side inductor $L_1$, the first clamp diode $D_{clamp1}$, and the clamp capacitor $C_{clamp}$ may constitute a closed loop, causing peak current $I_{peak2}$ to flow therethrough. As a result, the surge voltage is stored in the clamp capacitor $C_{clamp}$ through the primary side inductor $L_1$ and the first clamp diode $D_{clamp1}$.

After the switching element S1 is turned off, as exemplarily illustrated in FIG. 17B, the energy stored in the primary side inductor $L_1$ is output through the output diode $D_{out}$ and the secondary side inductor $L_2$. Output current $I_{off}$ is illustrated in FIG. 17B as flowing through the output diode $D_{out}$ and the secondary side inductor $L_2$.

In addition, after the switching element S1 is turned off, the surge voltage stored in the clamp capacitor $C_{clamp}$ is output through the second clamp diode $D_{clamp2}$. Clamp current $I_{out}$ is illustrated in FIG. 17B as flowing through the clamp capacitor $C_{clamp}$ and the second clamp diode $D_{clamp2}$.

Each of the converter units including the clamp units as illustrated in FIGS. 16A to 17B may adopt switching frequency variation depending on the duty of the switching element S1 as described above. This ensures enhancement in the power conversion efficiency of the converter unit 530.

When the converter unit includes a plurality of interleaving converters, the switching periods of the interleaving converters may be varied. In particular, the switching element S1 may be operated in a CRM. As a result, zero voltage switching with respect to the switching element S1 may be performed, which enhances the power conversion efficiency of the converter unit 530.

Figure 18:
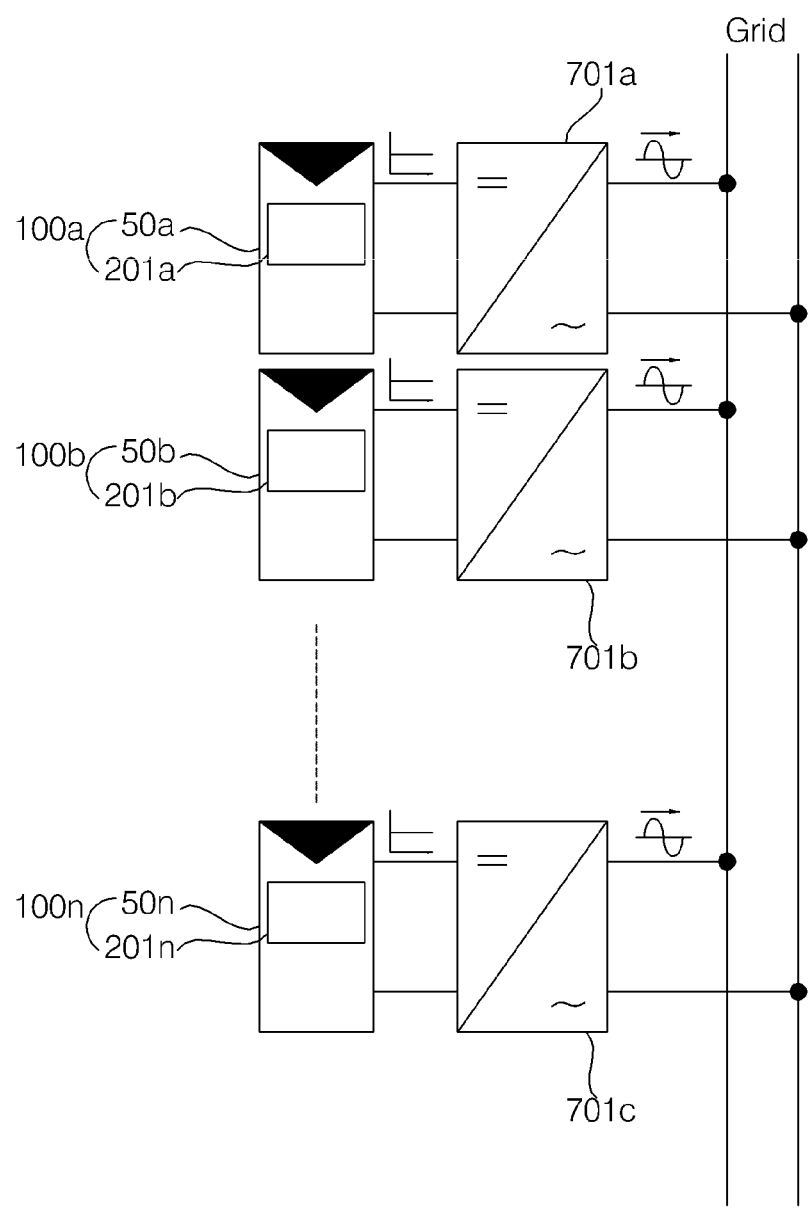
FIG. 18 is a view illustrating an exemplary configuration of a photovoltaic system according to another embodiment of the present invention.

FIG. 18 is a view illustrating an exemplary configuration of a photovoltaic system according to another embodiment of the present invention.

Referring to FIG. 18, the photovoltaic system, designated by reference numeral 20, is similar to the photovoltaic system 10 of FIG. 1 except that a junction box 201 includes only bypass diodes and power conversion modules 701a, 701b, . . . , 701n separated from the photovoltaic modules 50a, 50b, . . . , 50n each include a converter unit, a controller, and an inverter unit.

That is, the photovoltaic modules 50a, 50b, . . . , 50n may respectively include the solar cell modules 100a, 100b, . . . , 100n, and junction boxes 201a, 201b, . . . , 201n attached respectively to the rear surfaces of the solar cell modules 100a, 100b, . . . , 100n to output DC voltages from the solar cell modules 100a, 100b, . . . , 100n through the bypass diodes.

Each of the power conversion modules 701a, 701b, . . . , 701n may be electrically connected to an output terminal of each of the junction boxes 201a, 201b, . . . , 201n to convert an input DC voltage into an AC voltage and output the AC voltage.

The power conversion modules 701a, 701b, . . . , 701n may be connected in parallel to one another to supply the generated AC voltage to a system (grid).

Figure 19A:
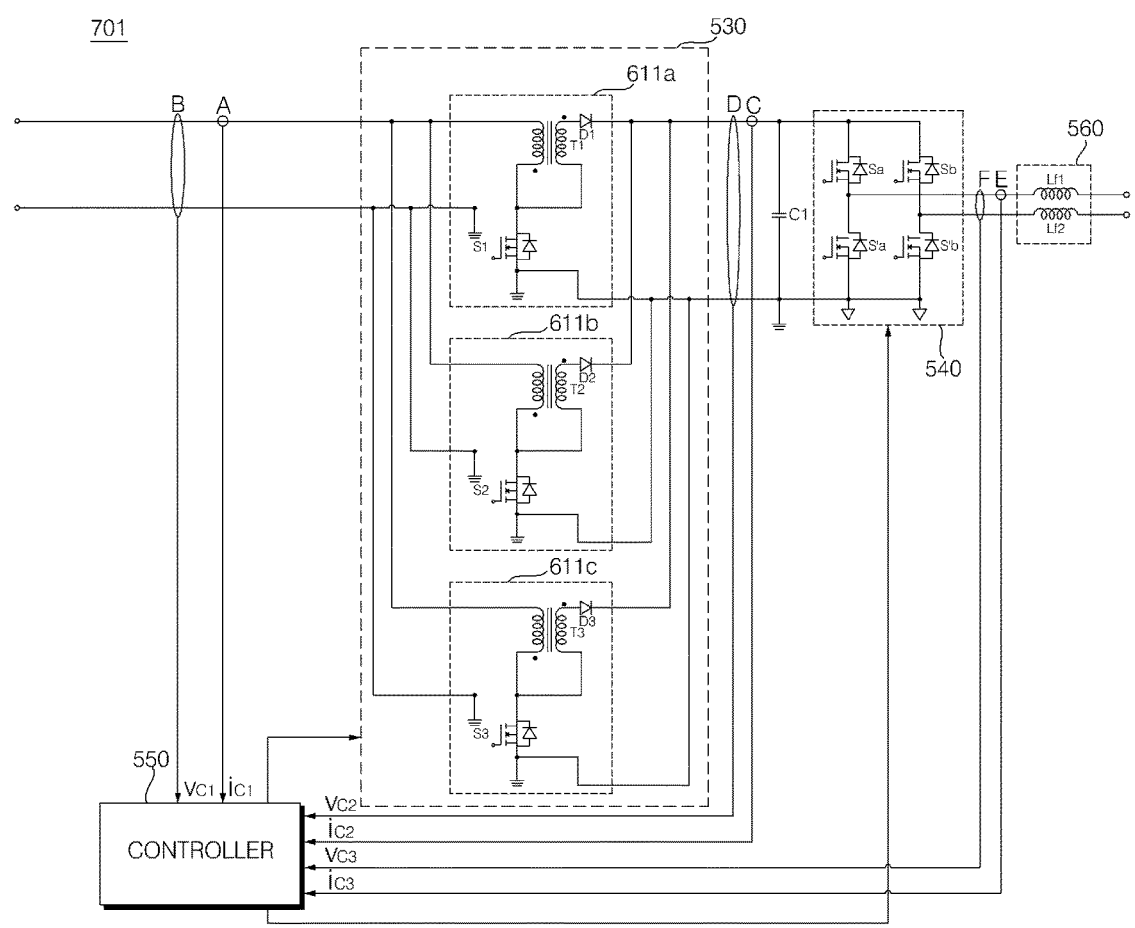
FIG. 19A is a circuit diagram illustrating an exemplary inner configuration of a power conversion module illustrated in FIG. 18.
Figure 19B:
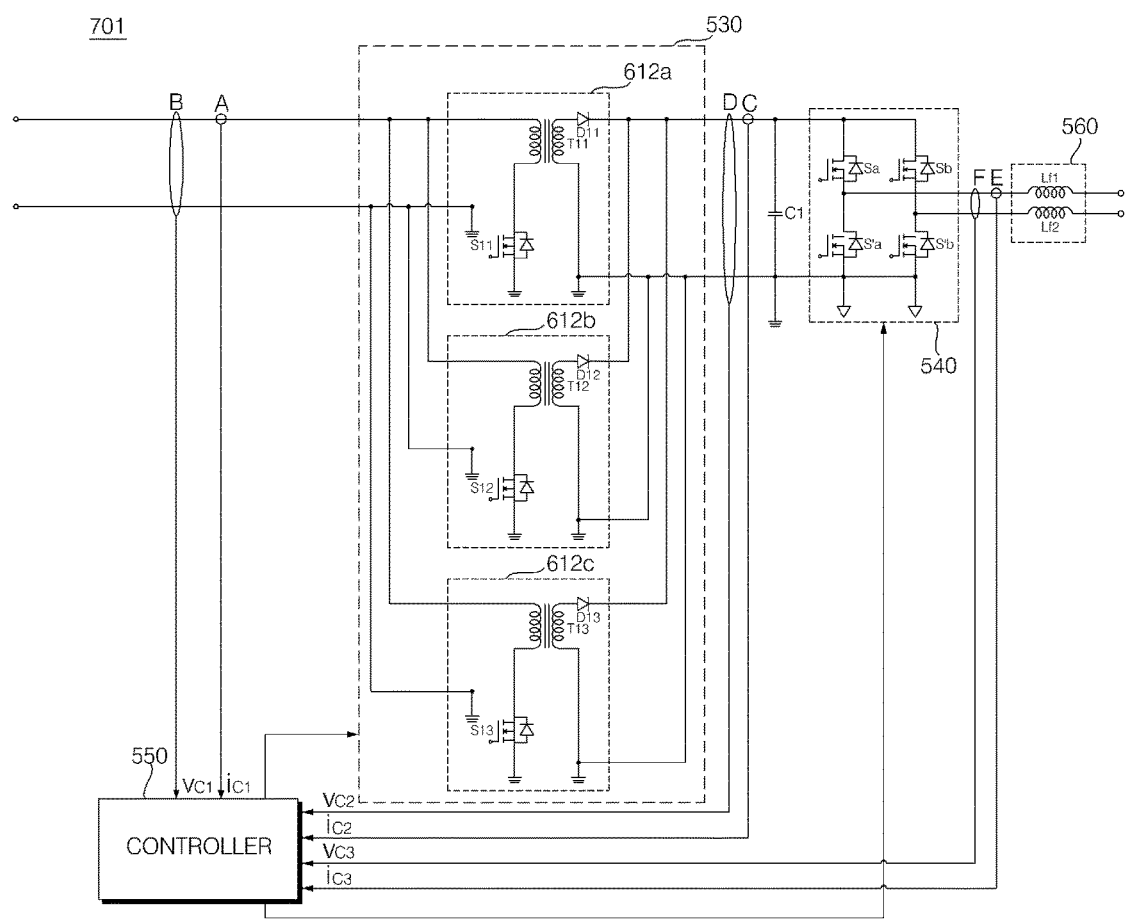
FIG. 19B is a circuit diagram illustrating another exemplary configuration of the power conversion module illustrated in FIG. 18.

FIG. 19A is a circuit diagram illustrating an exemplary inner configuration of the power conversion module illustrated in FIG. 18, and FIG. 19B is a circuit diagram illustrating another exemplary inner configuration of the power conversion module illustrated in FIG. 18.

The power conversion module 701 of FIG. 19A is similar to the power conversion module 700 of FIG. 7a, but does not include the bypass diode unit 510.

Accordingly, the power conversion module 701 may include the converter unit 530, the DC terminal capacitor C1, the inverter unit 540, the controller 550, and the filter unit 560. The converter unit 530 may include tapped inductor converters as interleaving converters.

The power conversion module 701 of FIG. 19B is similar to the power conversion module 700 of FIG. 7b, but does not include the bypass diode unit 510. In addition, the converter unit 530 of FIG. 19B may include flyback converters as interleaving converters.

Figure 20:
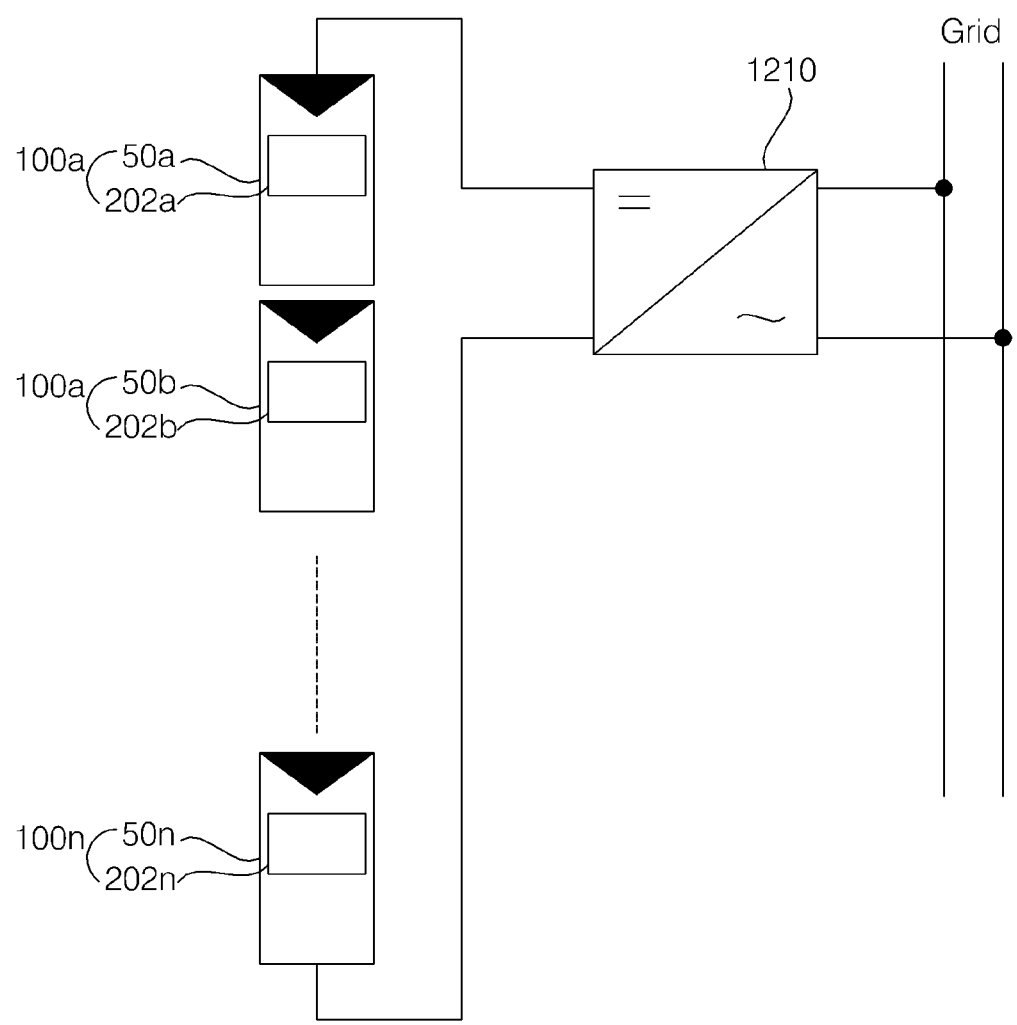
FIG. 20 is a view illustrating an exemplary configuration of a photovoltaic system according to another embodiment of the present invention.

FIG. 20 is a view illustrating an exemplary configuration of a photovoltaic system according to another embodiment of the present invention.

Referring to FIG. 20, the photovoltaic system 30 of FIG. 20 is similar to the photovoltaic system 10 of FIG. 1, but the junction box 201 includes, for example, bypass diodes, a converter unit, and a controller without an inverter unit. That is, the inverter unit is included in a separate power conversion module 1210, and the power conversion module 1210 is separated from the photovoltaic modules 50a, 50b, . . . , 50n.

That is, the photovoltaic modules 50a, 50b, . . . , 50n may respectively include the solar cell modules 100a, 100b, . . . , 100n, and junction boxes 202a, 202b, . . . , 202n attached respectively to the rear surfaces of the solar cell modules 100a, 100b, . . . , 100n to perform power conversion of DC voltages from the solar cell modules 100a, 100b, . . . , 100n and output the power-converted DC voltages. At this time, the output DC voltages may be pseudo DC voltages or boosted DC voltages.

The power conversion module 1210 may be electrically connected to output terminals of the respective junction boxes 202a, 202b, . . . , 202n to convert an input DC voltage into an AC voltage and output the AC voltage.

The power conversion module 1210 may supply the generated AC voltage to a system (grid).

Figure 21A:
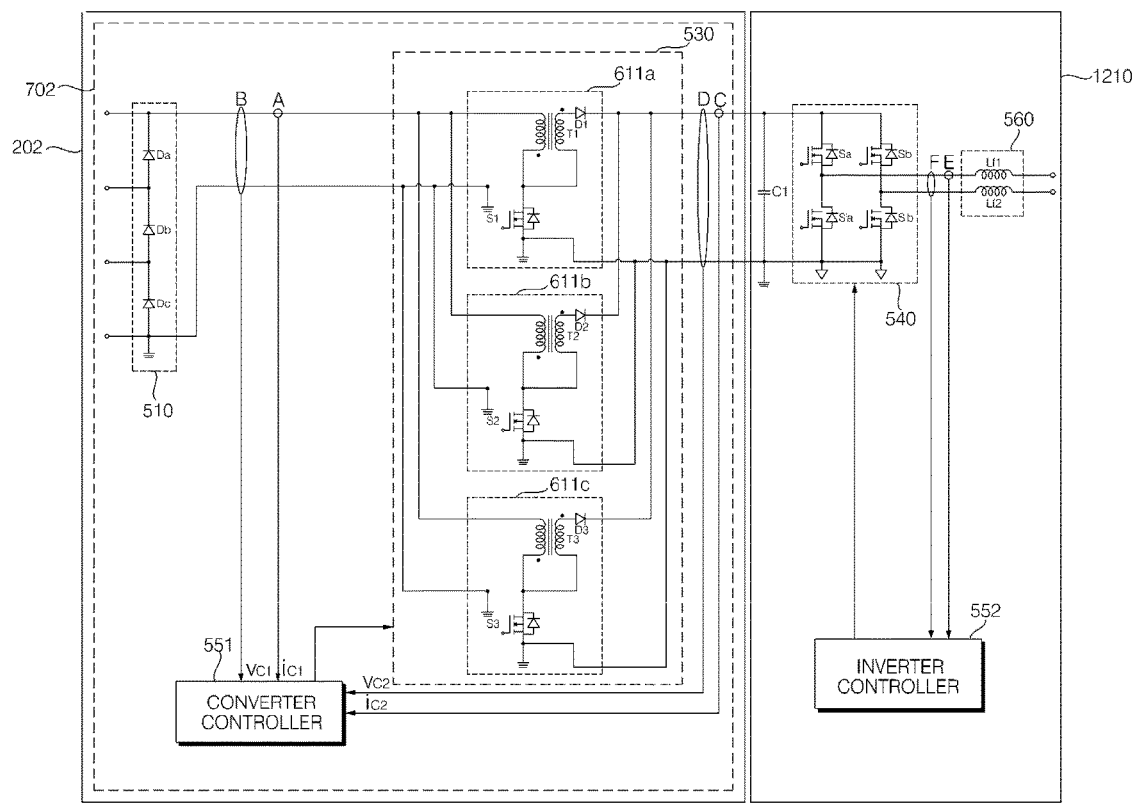
FIG. 21A is a circuit diagram illustrating an exemplary inner configuration of first and second power conversion modules illustrated in FIG. 20.
Figure 21B:
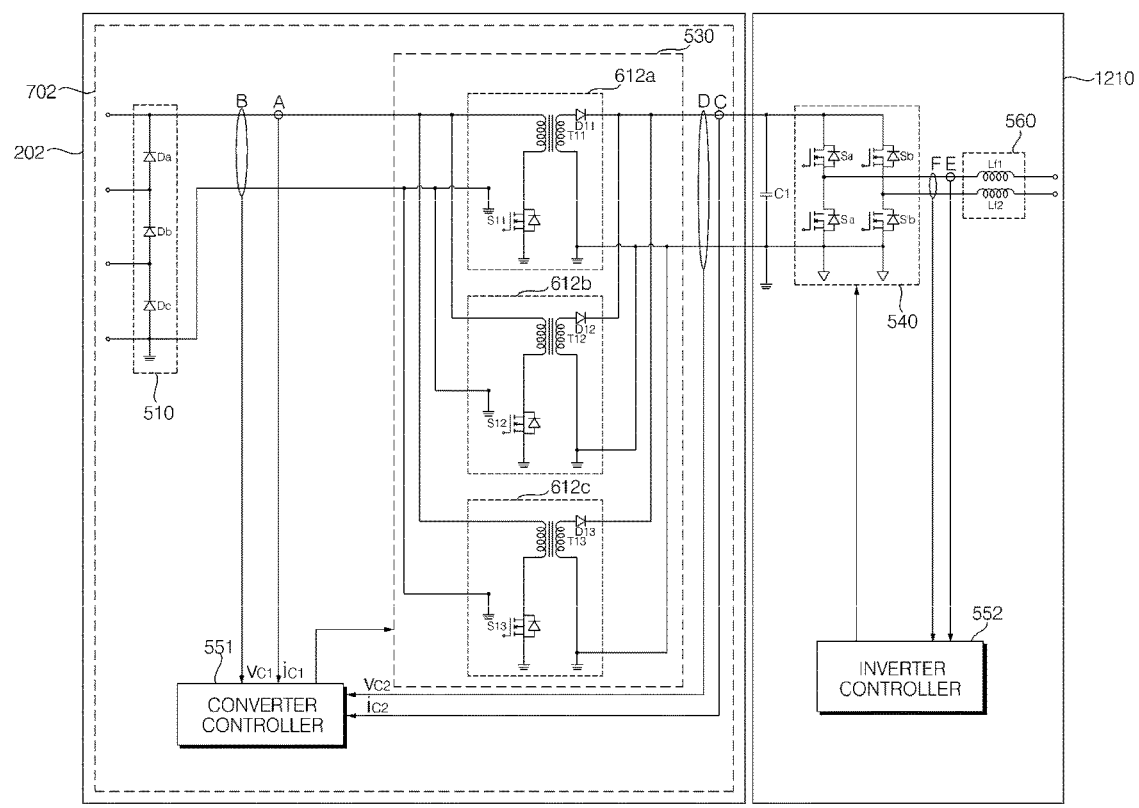
FIG. 21B is a circuit diagram illustrating another exemplary inner configuration of the first and second power conversion modules illustrated in FIG. 20.

FIG. 21A is a circuit diagram illustrating an exemplary inner configuration of first and second power conversion modules illustrated in FIG. 20, and FIG. 21B is a circuit diagram illustrating another exemplary inner configuration of the first and second power conversion modules illustrated in FIG. 20.

Referring to FIG. 21A, the first power conversion module 702 may include the bypass diode unit 510, the converter unit 530, the DC terminal capacitor C1, and a converter controller 551, and the second power conversion module 1210 may include the inverter unit 540, an inverter controller 552, and the filter unit 560.

The converter unit 530 may include tapped inductor converters as interleaving converters.

Referring to FIG. 21B, the power conversion module 702 may include the bypass diode unit 510, the converter unit 530, the DC terminal capacitor C1 and the converter controller 551, and the second power conversion module 1210 may include the inverter unit 540, the inverter controller 552, and the filter unit 560. The converter unit 530 of FIG. 21B may include flyback converters as interleaving converters.

The power conversion apparatus and the photovoltaic module according to the present invention may not be limitedly applied to the configurations and methods of the embodiments as described above and, however, some or all of the embodiments may be selectively combined with one another to achieve various modifications.

As is apparent from the above description, according to the embodiments of the present invention, a power conversion apparatus includes a converter unit to convert a DC voltage from a solar cell module, a clamp unit to limit a surge voltage in the converter unit, and a controller to control the converter unit, thereby being capable of limiting a surge voltage depending on operation of the converter unit. As a result, stability of elements in the power conversion apparatus may be enhanced.

More specifically, the clamp unit includes a clamp capacitor to temporarily store a surge voltage generated when a switching element in the converter unit is turned on or turned off, thereby being capable of outputting a surge voltage stored in the clamp capacitor when the switching element in the converter unit is turned off. As a result, stability of elements in the power conversion apparatus may be enhanced.

The converter unit may include a plurality of interleaving converters, and a plurality of clamp units to limit surge voltages in the interleaving converters. As such, a ripple of input current and output current of the converter unit is reduced. As a result, the capacity and size of circuit elements in the power conversion module may be advantageously reduced.

The interleaving converter is capable of varying the switching frequency of the switching element to correspond to variation in the duty of the switching element. As a result, the converter unit may achieve enhanced power conversion efficiency.

The power conversion module, which includes the converter unit consisting of the interleaving converters and the inverter unit, may be included in a junction box attached to a rear surface of a solar cell module. As a result, direct output of an AC voltage from the solar cell module may be stably accomplished.

Although the preferred embodiments of the present invention have been disclosed for illustrative purposes, those skilled in the art will appreciate that the present invention is not limited to the above-described embodiments and various modifications are possible without departing from the scope and spirit of the invention as disclosed in the accompanying claims. These modifications should not be understood separately from the idea or outlook of the present invention.

What is claimed is:

1. A power conversion apparatus comprising:
   a converter unit configured to convert a direct current (DC) voltage from a solar cell module;
   a clamp unit configured to limit a surge voltage in the converter unit; and
   a controller configured to control the converter unit,
   wherein the clamp unit includes a clamp capacitor configured to temporarily store the surge voltage generated when a switching element of the converter unit is turned on or turned off, and outputs the surge voltage stored in the clamp capacitor when the switching element of the converter unit is turned off.

2. The apparatus according to claim 1, wherein the converter unit includes a primary side inductor, a secondary side inductor, and the switching element connected between the primary side inductor and a ground terminal, and
   the clamp unit further includes:
      a first clamp diode having one terminal connected between the primary side inductor and the switching element;
      the clamp capacitor connected between the other terminal of the first clamp diode and an input terminal of the primary side inductor; and
      a second clamp diode connected between the other terminal of the first clamp diode and the secondary side inductor.

3. The apparatus according to claim 2, wherein the converter unit stores energy in the primary side inductor as the switching element is turned on, and outputs the energy stored in the primary side inductor through the secondary side inductor as the switching element is turned off, and
   wherein the clamp unit stores the surge voltage, generated when the switching element is turned on or turned off, in the clamp capacitor through the first clamp diode, and outputs the surge voltage stored in the clamp capacitor through the second clamp diode when the switching element is turned off.

4. The apparatus according to claim 2, wherein the converter unit includes a tapped inductor converter including the primary side inductor, the secondary side inductor, the switching element, and an output diode connected between the primary side inductor and the secondary side inductor to perform one-way conduction.

5. The apparatus according to claim 2, wherein the converter unit includes a flyback converter including the primary side inductor, the secondary side inductor, and the switching element.

6. The apparatus according to claim 1, wherein the converter unit includes a primary side inductor, a secondary side inductor, and the switching element connected between the primary side inductor and a ground terminal, and
   the clamp unit further includes:
      a first clamp diode having one terminal connected between element the primary side inductor and the switching element;
      the clamp capacitor connected between the other terminal of the first clamp diode and the ground terminal; and
      a second clamp diode connected between the other terminal of the first clamp diode and the secondary side inductor.

7. The apparatus according to claim 1, wherein the converter unit includes:
   a plurality of interleaving converters; and
   a plurality of clamp units configured to limit a surge voltage in each of the interleaving converters.

8. The apparatus according to claim 7, wherein the converter unit performs power conversion of the DC voltage to output a pseudo DC voltage, and
   wherein the controller varies a switching period of a switching element in each of the interleaving converters based on a duty for driving of the switching element in each of the interleaving converters.

9. The apparatus according to claim 8, wherein the controller sets the switching period so as to be increased as the duty is increased.

10. The apparatus according to claim 7, wherein the controller varies a switching period of the switching element in each interleaving converter for zero current switching or zero voltage switching with respect to the switching element.

11. The apparatus according to claim 7, further comprising:
    an input voltage detector configured to detect an input voltage to the converter unit; and
    a DC terminal voltage detector configured to detect an output voltage from the converter unit,
    wherein the controller calculates a zero crossing timing of current flowing through the switching element in each interleaving converter or a voltage at both terminals of the switching element, based on the detected input voltage and the detected output voltage, after the switching element is turned on and turned off, and varies the switching period based on the zero crossing timing.

12. The apparatus according to claim 1, wherein the converter unit performs power conversion of the DC voltage to output a pseudo DC voltage, and
    wherein the controller controls the converter unit so that the output pseudo DC voltage follows a target sinusoidal waveform.

13. The apparatus according to claim 1, further comprising:
    a capacitor configured to store a voltage output from the converter unit;
    an inverter unit configured to output an alternating current (AC) voltage using the voltage stored in the capacitor; and
    a filter unit configured to filter and output the AC voltage from the inverter unit,
    wherein the controller controls the converter unit and the inverter unit.

14. The apparatus according to claim 1, further comprising at least one bypass diode configured to receive the DC voltage from the solar cell module,
    wherein the converter unit performs power conversion of the DC voltage from the bypass diode.

15. A photovoltaic module comprising:
    a solar cell module including a plurality of solar cells; and
    a junction box attached to a rear surface of the solar cell module, the junction box including a power conversion module configured to perform power conversion of a DC voltage supplied from the solar cell module and to output the DC voltage, wherein the power conversion module includes:
- at least one bypass diode configured to receive the DC voltage from the solar cell module;
- a converter unit configured to convert the DC voltage from the bypass diode;
- a clamp unit configured to limit a surge voltage in the converter unit; and
- a controller configured to control the converter unit, and wherein the clamp unit includes a clamp capacitor configured to temporarily store the surge voltage generated when a switching element of the converter unit is turned on or turned off, and outputs the surge voltage stored in the clamp capacitor when the switching element of the converter unit is turned off.

16. The module according to claim 15, wherein the converter unit includes a primary side inductor, a secondary side inductor, and the switching element connected between the primary side inductor and a ground terminal, and the clamp unit includes:
- a first clamp diode having one terminal connected between the primary side inductor and the switching element;
- the clamp capacitor connected between the other terminal of the first clamp diode and an input terminal of the primary side inductor; and
- a second clamp diode connected between the other terminal of the first clamp diode and the secondary side inductor.

17. The module according to claim 16, wherein the converter unit stores energy in the primary side inductor as the switching element is turned on, and outputs the energy stored in the primary side inductor through the secondary side inductor as the switching element is turned off, and wherein the clamp unit stores the surge voltage, generated when the switching element is turned on or turned off, in the clamp capacitor through the first clamp diode, and outputs the surge voltage stored in the clamp capacitor through the second clamp diode when the switching element is turned off.

18. The module according to claim 15, wherein the converter unit includes a primary side inductor, a secondary side inductor, and the switching element connected between the primary side inductor and a ground terminal, and the clamp unit includes:
- a first clamp diode having one terminal connected between the primary side inductor and the switching element;
- the clamp capacitor connected between the other terminal of the first clamp diode and the ground terminal; and
- a second clamp diode connected between the other terminal of the first clamp diode and the secondary side inductor.

19. The module according to claim 15, wherein the power conversion module further includes:
- a capacitor configured to store a voltage output from the converter unit;
- an inverter unit configured to output an AC voltage using the voltage stored in the capacitor; and
- a filter unit configured to filter and output the AC voltage from the inverter unit, wherein the controller controls the converter unit and the inverter unit.

* * * * *